United States Patent
Fiala Amokrane

(10) Patent No.: US 11,247,754 B1
(45) Date of Patent: Feb. 15, 2022

(54) WATER VESSEL FLOTATION SYSTEM

(71) Applicant: Marie Claire Fiala Amokrane, Downey, CA (US)

(72) Inventor: Marie Claire Fiala Amokrane, Downey, CA (US)

(*) Notice: Subject to any disclaimer, the term of this patent is extended or adjusted under 35 U.S.C. 154(b) by 0 days.

(21) Appl. No.: 17/154,387

(22) Filed: Jan. 21, 2021

Related U.S. Application Data

(60) Provisional application No. 62/963,972, filed on Jan. 21, 2020.

(51) Int. Cl.
  *B63B 43/12* (2006.01)
  *B63C 7/00* (2006.01)
  *B63C 7/06* (2006.01)
  *F16K 31/32* (2006.01)

(52) U.S. Cl.
  CPC .......... *B63C 7/003* (2013.01); *B63C 7/06* (2013.01); *F16K 31/32* (2013.01); *B63B 2043/126* (2013.01)

(58) Field of Classification Search
  CPC .......... B63C 7/003; B63C 7/06; F16K 31/32; B63B 2043/126; B63B 2043/145
  See application file for complete search history.

(56) References Cited

U.S. PATENT DOCUMENTS

| | | |
|---|---|---|
| 644,480 A | 2/1900 | De Villa |
| 3,092,853 A * | 6/1963 | Owen ............... B63B 43/14 |
| | | 114/69 |
| 3,822,662 A | 7/1974 | Morita et al. |
| 4,458,618 A | 7/1984 | Tuffier |
| 4,864,961 A | 9/1989 | Slonski |
| 4,996,936 A | 3/1991 | Brundritt |
| 6,470,818 B1 | 10/2002 | Mears et al. |

(Continued)

FOREIGN PATENT DOCUMENTS

| | | | |
|---|---|---|---|
| FR | 2486016 A1 | 1/1982 | |
| GB | 191419527 A | * 7/1915 | ............ B63B 43/16 |
| WO | WO2001093390 | 12/2001 | |

OTHER PUBLICATIONS

Turtlepac.com, https://www.turtlepac.com/products/underwater-lift-bags-yacht-floatation-pipeline-buoyancy-bags/, prior to Jun. 2019.

(Continued)

*Primary Examiner* — Andrew Polay
(74) *Attorney, Agent, or Firm* — Canady & Lortz LLP; Bradley K. Lortz

(57) ABSTRACT

A water vessel flotation system is disclosed comprising a plurality of inflatable bladders disposed within a vessel. In the event of capsizing or hull rupture, the bladders can be automatically inflated with compressed gas. Inflation of the bladders can be performed by one or more omni directional float triggered valves coupled between the compressed gas tanks and the bladders. Each valve is operated by a lever having a flexible link (e.g. a chain) attached to its end. The flexible link extends somewhat perpendicularly away from the lever end to pass through an eyelet at distal point. A float is attached to the flexible link after exiting the eyelet allowing the buoyant action of the float in any direction to cause the flexible link to be pulled toward the eyelet and thereby pulling the lever end and opening the valve.

10 Claims, 26 Drawing Sheets

(56) References Cited

U.S. PATENT DOCUMENTS

| | | | |
|---|---|---|---|
| 6,484,656 B2 | 11/2002 | Mears et al. | |
| 2002/0011200 A1* | 1/2002 | Mears | F17C 5/06 |
| | | | 114/345 |
| 2003/0213420 A1 | 11/2003 | Mears et al. | |
| 2008/0311805 A1 | 12/2008 | Spears et al. | |
| 2016/0138236 A1* | 5/2016 | Cocciardi | F16K 31/32 |
| | | | 137/423 |

OTHER PUBLICATIONS

Boats.com, "The Truth About Unsinkable Boats," Dec. 2016.
Kingii inflatable wrist band, http://kingii.it/en/kingii-inflatable-bracelet-for-your-familys-safety/, 2019.
Interesting Engineering, "EU project develops air bag . . . ," https://interestingengineering.com/eu-project-develops-air-bag-ship-rescue-system-to-prevent-sinking, Jul. 13, 2014.
Forum.zegluj.net, https://forum.zegluj.net/viewtopic.php?f=22&t=23596, autotranslation, Jan. 2016.
Turtlpac.com, https://www.turtlepac.com/products/flexible-water-diesel-holding-yacht-tanks/, prior to Jun. 2019.

* cited by examiner

WATER VESSEL FLOTATION SYSTEM

CROSS-REFERENCE TO RELATED APPLICATION

This application claims the benefit under 35 U.S.C. § 119(e) of the following U.S. provisional patent application, which is incorporated by reference herein:

U.S. Provisional Patent Application No. 62/963,972, filed Jan. 21, 2020, and entitled "WATER VESSEL FLOTATION SYSTEM," by Marie Claire Fiala Amokrane.

BACKGROUND OF THE INVENTION

1. Field of the Invention

This invention relates to a water vessel flotation system. Particularly, this invention relates to a water vessel flotation system employing bladders that automatically inflate by compressed gas in the event of capsizing or a hull breach.

2. Description of the Related Art

The most obvious risk for any water vessel is sinking. Sinking can arise from a structural failure causing a hull breach either from a severe storm or some other accident. Alternately, it is also possible for a water vessel to be capsized by severe weather or an accident. In any case, once water has an unclosable path past the hull it becomes certain that the vessel will sink resulting in a loss of property as well a potential loss of life. In these situations time is critical. Accordingly, there is a need for systems and methods which can quickly replace buyancy to a water vessel that is rapidly losing it. Some systems have been previously developed to address this.

U.S. Pat. No. 4,458,618 by Tuffier, issued Jul. 10, 1984 describes a device that renders unsinkable a boat such as a habitable boat having a cabin and a cockpit. The device comprises three inflatable envelopes two of which are placed on starboard side and port side bunks respectively whereas the other envelope is placed on the floor of the cabin between the two bunks. A compressed gas container controlled by a valve is connected to all the envelopes for inflating the envelopes when required.

U.S. Pat. No. 6,470,818 by Mears, issued Oct. 29, 2002 describes a flotation device comprising a carrier mounted to the watercraft with the carrier having a first cover channel, a second cover channel, a first bladder retaining slot, and a second bladder retaining slot. A space is defined between the carrier and an elongated cover having a first edge and a second edge with the first edge releasably receivable in the first cover channel and the second edge releasably receivable in the second cover channel. A cover-removing bladder is receivable within the space and secured to the carrier. A flotation bladder is receivable within the space and secured to the carrier. An inflation mechanism connected to the cover-removing bladder and the flotation bladder inflates both bladders wherein the first edge of the cover is released from the first cover channel of the carrier allowing the flotation bladder to substantially completely inflate.

U.S. Patent Application Publication No. 2008/0311805 by Spear et al., published Dec. 18, 2008 describes a device which provides buoyancy to objects with negative buoyancy in water. The invention comprises a water-sensitive trigger which, when activated, causes a balloon to inflate, causing the object to float upon the surface where the user can then easily and safely retrieve it, through one of two mechanisms: first, a compressed gas is allowed to exit a canister and enter a balloon, second, one or more substances which, when mixed with water will produce bubbles are exposed to water and the balloon is filled with bubbles from the chemical reaction. There are a number of variable characteristics, including canister size and shape, trigger fuse length, balloon configuration, and housing material that allow a user tremendous flexibility in selecting a proper size of the invention for the user's intended purpose.

Other flotation systems for vessels have also been developed. One device, marketed under the name Turtle-Pac, comprises collapsible yacht tanks. These tanks can be used in a variety of applications including yacht flotation involving inflation within interior spaces of a yacht cabin. However, the tanks are to be filled by compressed gas tanks in a manual operation. Another proposed flotation system is the Surfacing System for Ship Recovery (SuSy project) which involves an airbag system that would deploy airbags during times of distress that would help keep the vessel afloat. The system could adapt a rescue system used in submarines that uses liquid or solid fuel to blow water out of the ballast tanks in a very short time to provide additional buoyancy combined with air pressure systems with inflatable Kevlar reinforced balloons.

In view of the foregoing, there is a need in the art for apparatuses and methods for preventing sinking of water vessels. There is a need for such apparatuses and methods to function quickly and automatically in the event of capsizing or a hull breach. These and other needs are met by the present invention as detailed hereafter.

SUMMARY OF THE INVENTION

A water vessel flotation system is disclosed comprising a plurality of inflatable bladders disposed within a vessel. In the event of capsizing or hull rupture, the bladders can be automatically inflated with compressed gas. Inflation of the bladders can be performed by one or more omni directional float triggered valves coupled between the compressed gas tanks and the bladders. Each valve is operated by a lever having a flexible link (e.g. lanyard, chain) attached to its end. The flexible link extends somewhat perpendicularly away from the lever end to pass through an eyelet at distal point. A float is attached to the flexible link after exiting the eyelet allowing the buoyant action of the float in any direction to cause the flexible link to be pulled toward the eyelet and thereby pulling the lever end and opening the valve.

A typical embodiment of the invention comprises a water vessel flotation system including one or more inflatable bladders, one or more compressed gas storage tanks, one or more valves coupled between the one or more inflatable bladders and the one or more compressed gas storage tanks, each valve having a lever for opening and closing the valve and a flexible link coupled to each lever, and a float coupled to each flexible link. Each flexible link extends somewhat perpendicularly away from the lever end to pass through an eyelet at distal point before being coupled to the float such that buoyant action of the float in any direction can cause the flexible link to be pulled toward the eyelet and thereby pull the lever and opening the valve causing compressed gas in the one or more compressed gas storage tanks to fill the one or more inflatable bladders.

In further embodiments, a first manifold can be coupled between the one or more compressed gas storage tanks and the one or more valves. A second manifold can be coupled between the one or more valves and the one or more inflatable bladders. The one or more inflatable bladders can be anchored to bulkhead or stringers within an interior of a water vessel. The one or more inflatable bladders can comprise six inflatable bladders within an interior of a water vessel and the one or more compressed gas storage tanks can comprise four compressed gas storage tanks disposed along a central hull of a water vessel.

In still further embodiments, at least one of the one or more inflatable bladders can be secured using at least one strap to an elongated hole in an L bracket of an anchor plate where the L bracket is secured with a backing plate. Further, the one or more inflatable bladders can be disposed on the deck adjacent to gunnels of the vessel. In addition, a pressure regulated valve can be coupled between each of the one or more inflatable bladders and the one or more compressed gas storage tanks. Finally, in some embodiments, at least one of the one or more inflatable bladders can comprise a rectangular shape having clipped corners.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

As previously mentioned, a water vessel flotation system is disclosed comprising a plurality of inflatable bladders disposed within a vessel. In the event of capsizing or hull rupture, the bladders can be automatically inflated with compressed gas. Inflation of the bladders can be performed by one or more omni directional float triggered valves coupled between the compressed gas tanks and the bladders. Each valve is operated by a lever having a flexible link (e.g. a chain) attached to its end. The flexible link extends somewhat perpendicularly away from the lever end to pass through an eyelet at distal point. A float is attached to the flexible link after exiting the eyelet allowing the buoyant action of the float in any direction to cause the flexible link to be pulled toward the eyelet and thereby pulling the lever end and opening the valve.

When a vessel, sailboat or motor yacht, ends up taking on an unsustainable amount of water from a breach of the hull, or a rogue wave crashes over it immediately capsizing the vessel, the water in the hull triggers a system that actives a series of compressed air tanks releasing simultaneously into a series of air bladders immediately inflating to impede the vessel from sinking.

Ideally, if the vessel is only at risk of capsizing and water has not yet entered the cabin below, the system can be activated manually, e.g. "T-handle" located at the cockpit or in the cabin below at the navigation station can be pulled to simultaneously inflate the bladders in the cabin to remain the vessel upright and afloat before any significant damage to the vessel has occurred.

Some embodiments of the invention can be implemented as a universal kit for original equipment manufacturer (OEM) and after market refit (AMR) that is fully re-usable for all kinds of water vessels including, but not limited to, cabin cruiser, inboard/outboard, power boats, trawlers, motor cruisers, sailboats (racers and cruisers), and can be adapted for many military use vessels (open skeleton interior) even for amphibious vessels.

The bladders have been developed with a particular "anchor plate set" as described hereafter so they can also be used in the cockpit, on the deck, at the base of the superstructure and below gunwales. In this case, the bladders still remain inside the hull but are not restricted to the interior. This variant allows application to a greater number of existing vessel designs because many vessels do not have the physical interior space to support the cubic "air" volume necessary to keep the vessel afloat.

2. Exemplary Water Vessel Flotation System

Figure 1A:
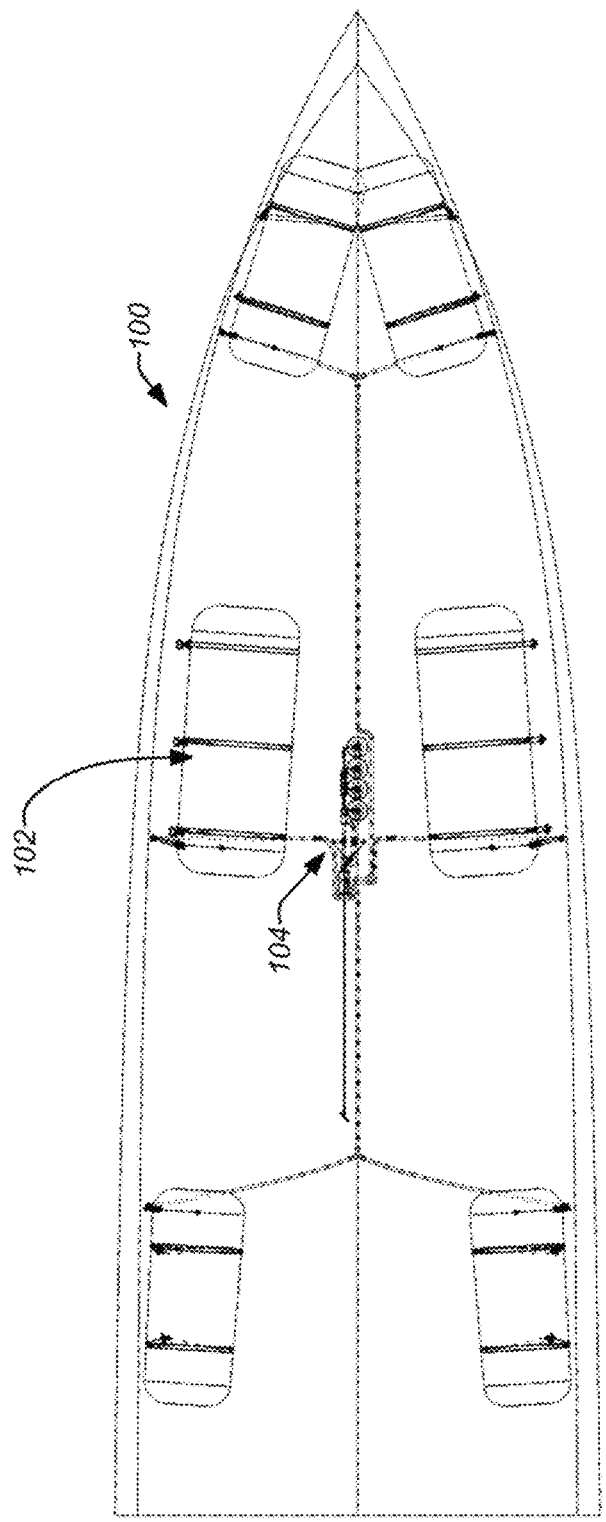
FIG. 1A shows a schematic diagram illustrating top view of example locations for inflatable bags within a yacht hull.
Figure 1B:
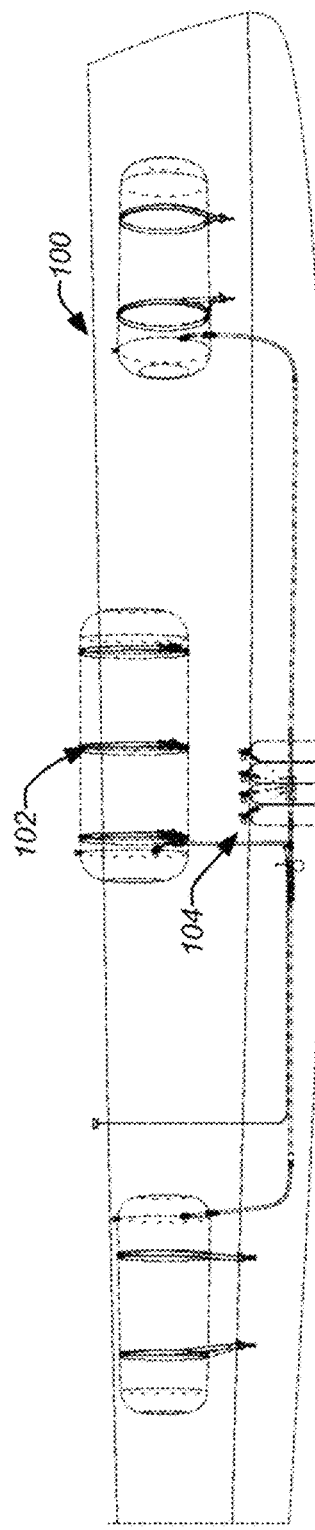
FIG. 1B shows a schematic diagram illustrating side view of example locations for inflatable bags within a yacht hull and gas cylinders for inflation.

FIG. 1A shows a schematic diagram illustrating top view of example locations for inflatable bladders 102 (i.e. air bladders, inflatable bags) within a yacht hull and FIG. 1B shows a schematic diagram illustrating side view of example locations for inflatable bladders 102 within a yacht hull and gas tanks 104 for inflation. In the example system 100, there are four standard 80 cubic foot dive tanks (compressed gas tanks 104) filled with compressed air at 3000 psi located as close to the centerline of the vessel as possible and as low as possible to the center of gravity and below the center of flotation. These tanks 104 can be tied down with the classic tank straps attached to the stringers or bulkheads with "U"-bolts or stainless steel screws. Each of these tanks 104, can employ a first stage regulator attached so the pressure is maintained at approximately 140 psi (120-150 psi depending on the specific tank type). Those skilled in the art will appreciate that other systems can be readily developed for other vessels depending on size and equipment applying the principles described herein. Variation of the number, size and location of inflatable bladders and tanks as well as the alternate plumbing architecture can be used remaining consistent with the example embodiments of the invention described herein.

A first gas manifold may be used to combine the output from the individual compressed gas tanks. From each regulator, a ⅜" hose can have a check valve between the 1st stage regulator and the manifold where the air from the tanks is merged. In one example, the manifold can employ four female inlets ⅜" wide with a single ¾" outlet.

Figure 1C:
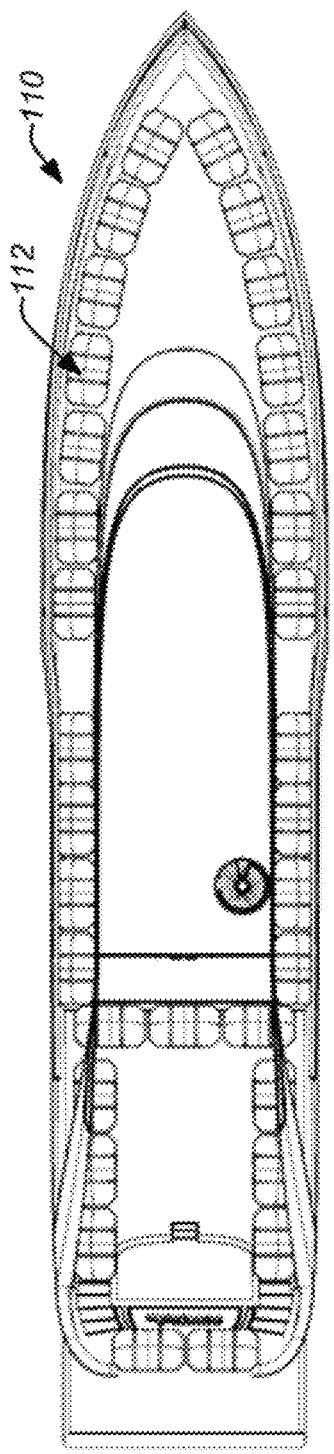
FIG. 1C illustrates an example motor yacht employing an embodiment of the invention having locations for inflatable bags to balance the buoyancy in use.
Figure 1D:
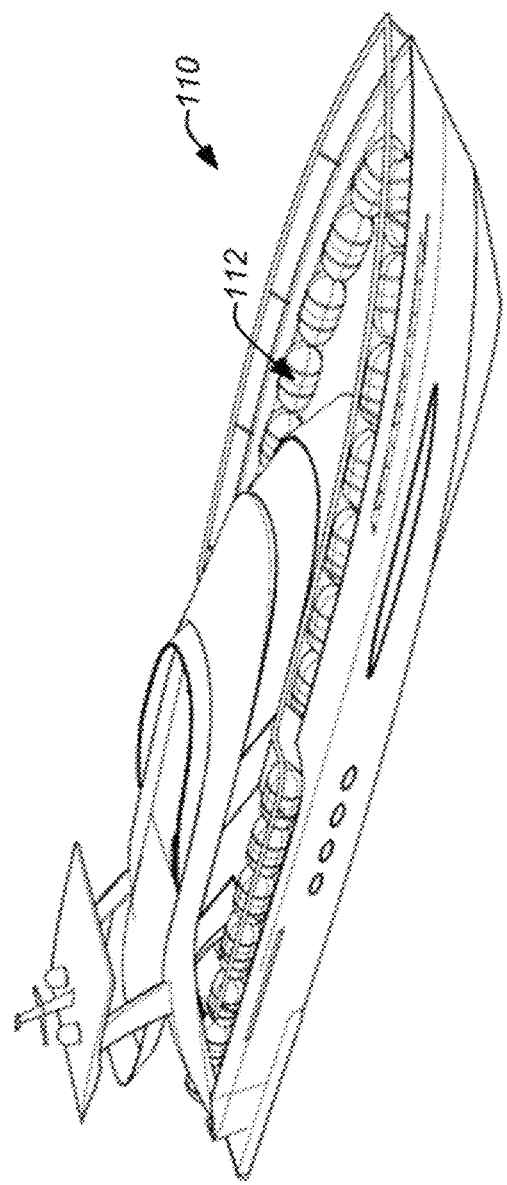
FIGS. 1D and 1E illustrates the example motor yacht of FIG. 1C from a fore starboard and aft port views, respectively, showing the inflatable bags adjacent the gunnels.
Figure 1E:
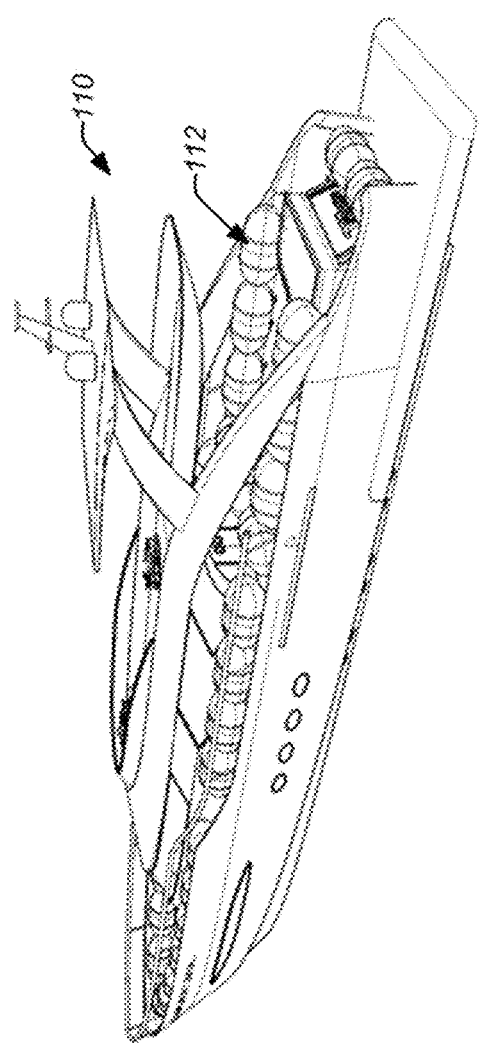

FIG. 1C illustrates an example motor yacht 110 employing an embodiment of the invention having locations for inflatable bags to balance the buoyancy in use. FIGS. 1D and 1E illustrates the example motor yacht of FIG. 1C from a fore starboard and aft port views, respectively, showing the inflatable bags adjacent the gunnels (the outermost top edge of the vessel hull). Ideally, the bags will be below the gunnels when not inflated although they can exceed the gunnels under inflation. In this example, the motor yacht can be 135 ft. The plurality of inflatable bags 112 are disposed around the perimeter of the hull on the deck. Those skilled in the art will appreciate that any suitable number of inflatable bags 112 can be employed as needed to ensure the vessel does not sink if the hull is damaged or the vessel otherwise becomes swamped.

Figure 1F:
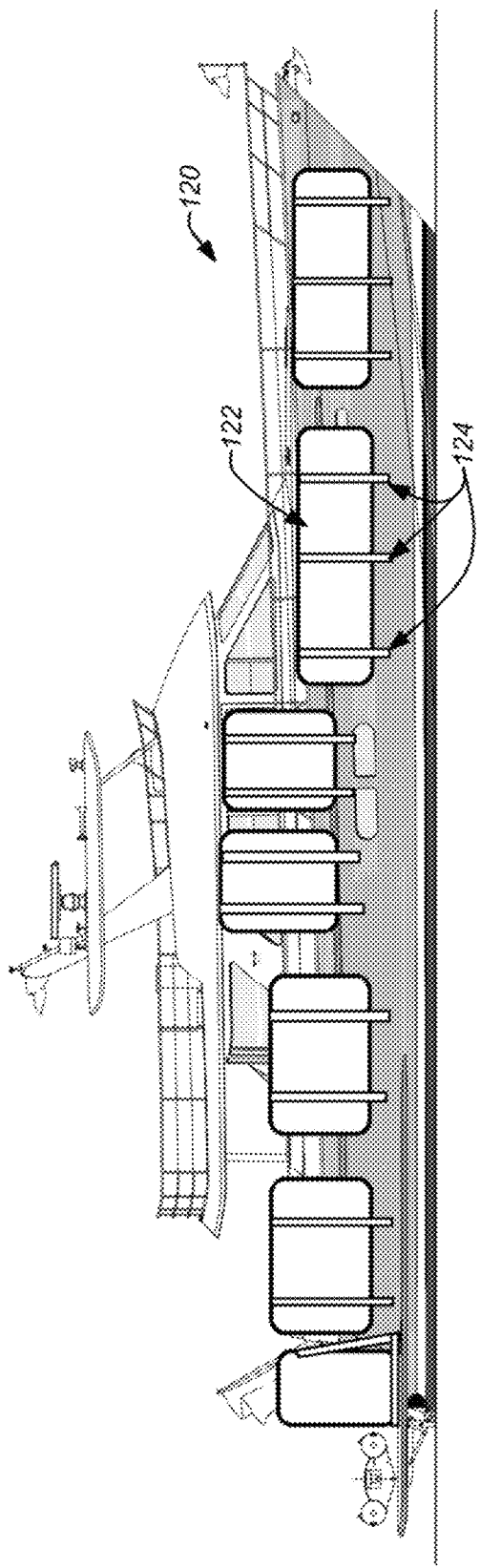
FIG. 1F illustrates another example motor yacht employing an embodiment of the invention showing anchor points and locations for inflatable bags.

FIG. 1F illustrates another example motor yacht 120 employing an embodiment of the invention showing anchor points 124 and locations for an example inflatable bag 122. The seven differently sized inflatable bags 122 shown on the starboard side of the yacht 120 would be balanced with the same number at the mirrored locations on port side (not shown). As shown, each inflatable bag 122 includes an appropriate number of anchor points 124 to secure the bag 122 against the buoyant force exerted by the bag 122 based on its inflation and the elevation of the surrounding water.

Figure 2A:
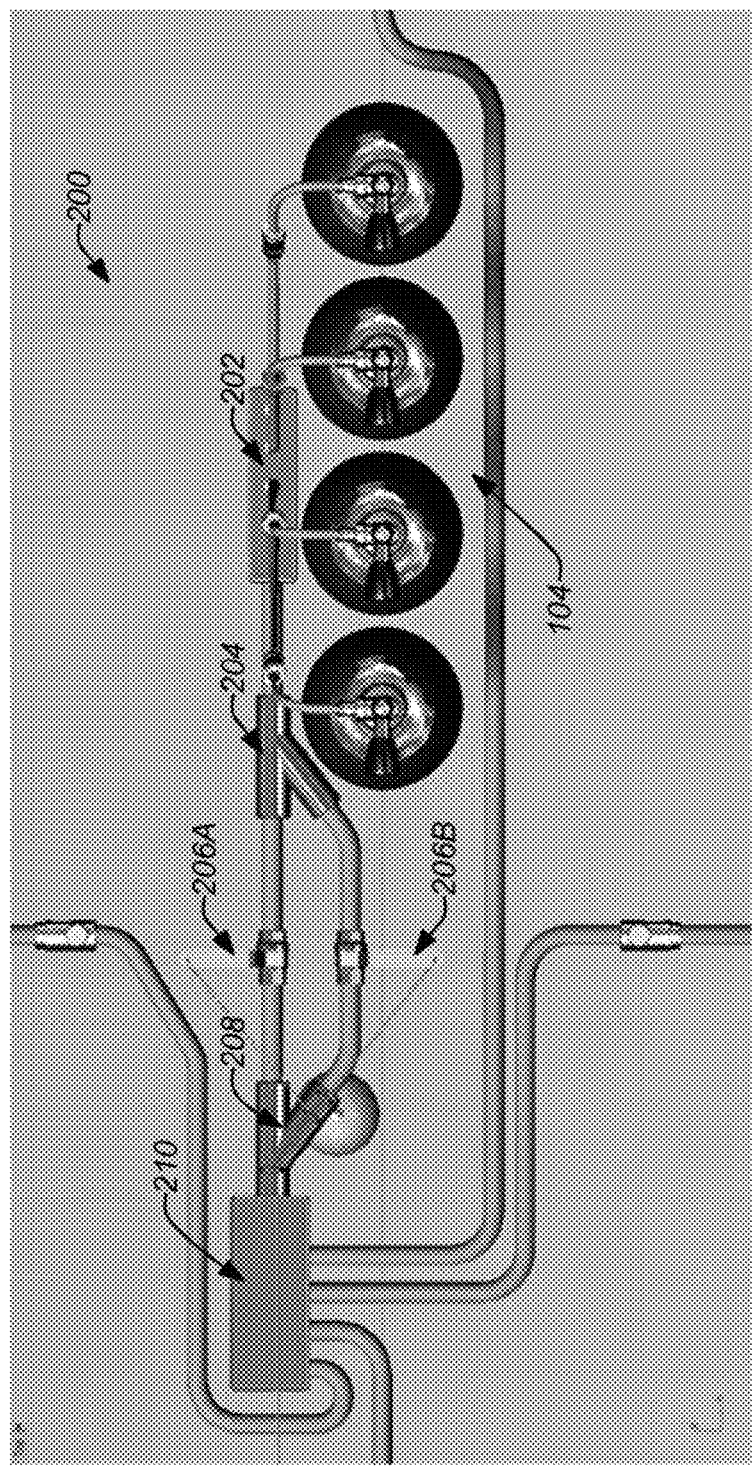
FIGS. 2A-2C show schematic diagrams illustrating gas cylinders and valving system.
Figure 2B:
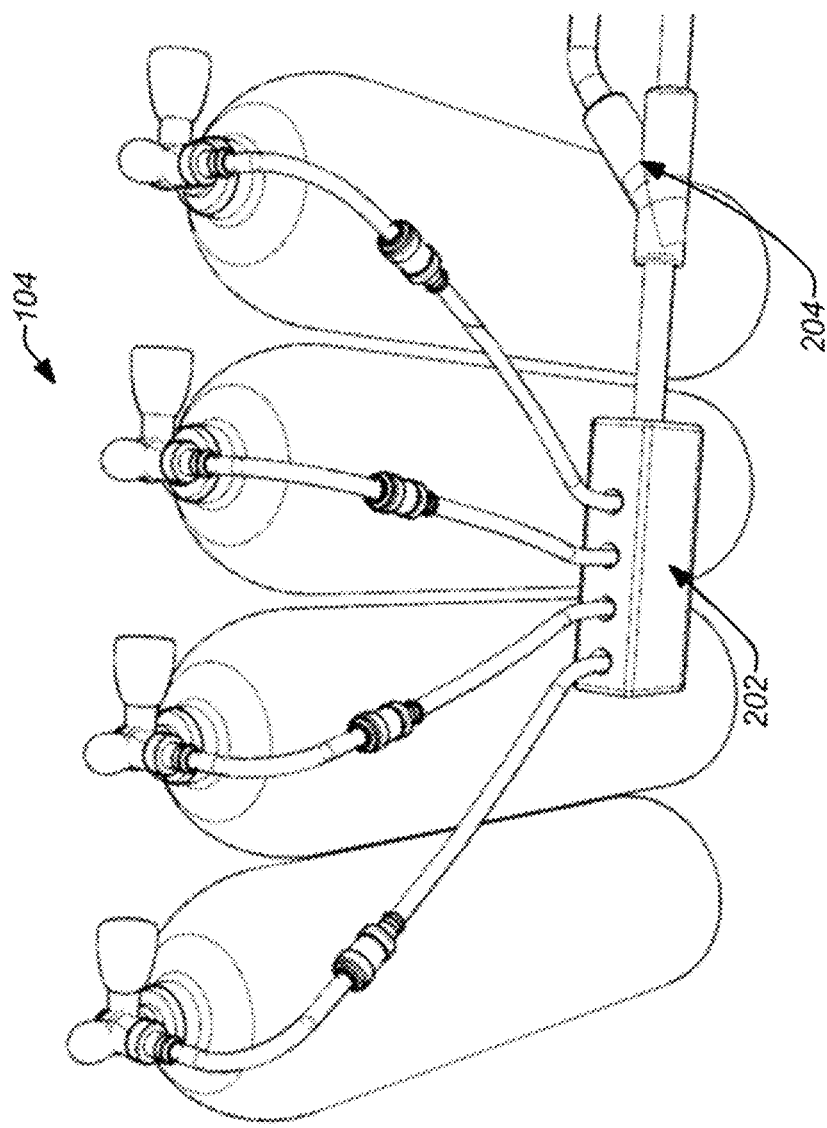
Figure 2C:
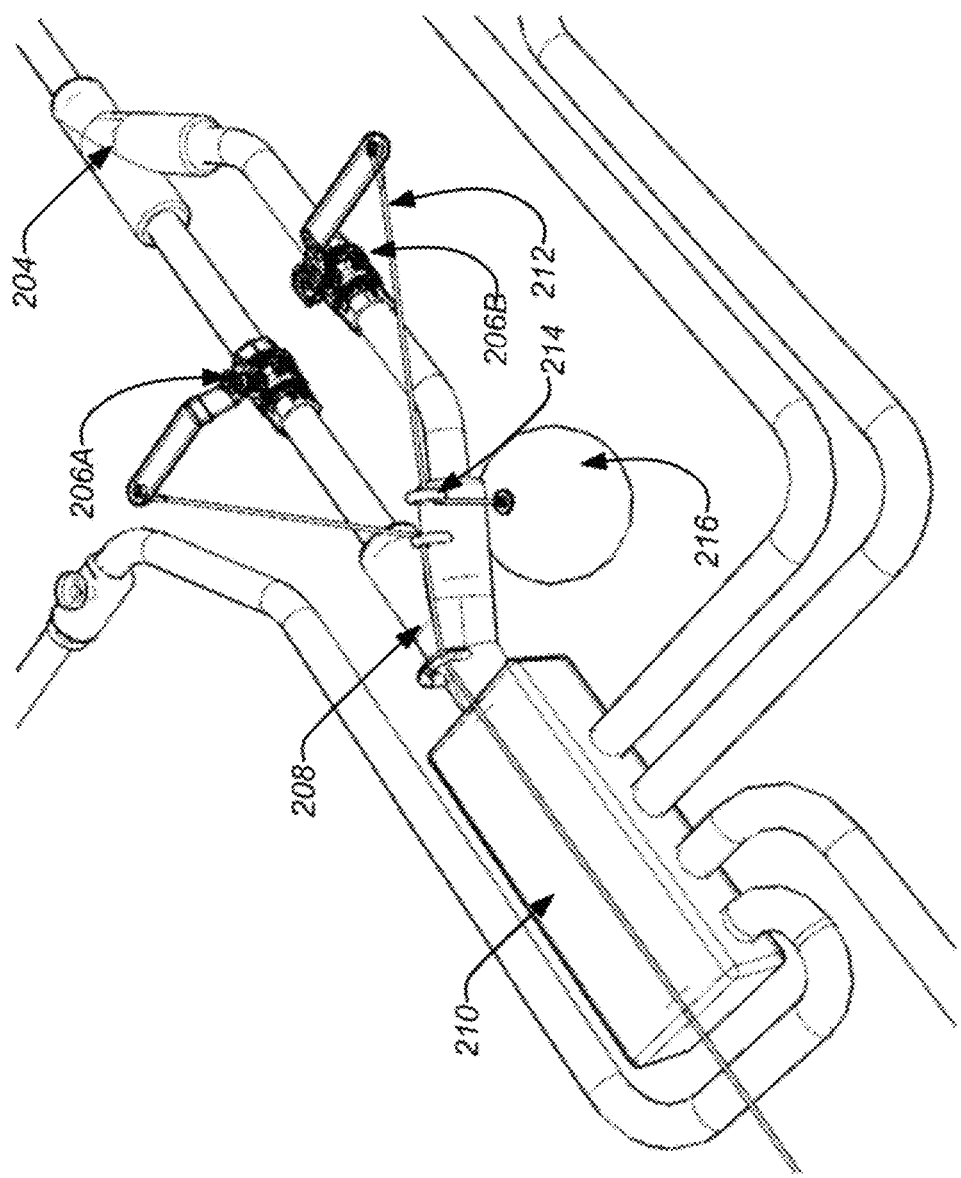

FIGS. 2A-2C show schematic diagrams illustrating gas cylinders 104 and valving system 200. The one or more compressed gas source, i.e. gas cylinders, are each coupled to a gas manifold 202 which combines and distributes the gas supply to the air bladders when needed. From the first gas manifold 202 the ¾" outlet hose can employ a Y split fitting 204 to which two other ¾" hoses are attached and can enable either of a pair of water level valve triggers 206A, 206B. The diameter and length of the hoses can be varied depending on the configuration of the particular water vessel, e.g. yacht. The outlets of the valve triggers 206A, 206B are then rejoined at another Y split fitting 208 whose outlet is then fed to another manifold 210 which distributes the compressed gas supply to all the bags 122 throughout the vessel. Splitting the gas supply from the manifold 202 in the manners enables redundant triggering of the system 200 as opening any one valve trigger will cause all air bags 122 connected the system 200 to inflate.

From each branch of the Y split ¾" hoses, there is located a ¾" ball valve trigger 206A, 206B in line with an attached manual lever (e.g. a T-handle) designed to pull the ball valve lever to the open position when needed. At least one of these manual levers is accessible from both inside the main cabin and the cockpit. Activation may also be provided from other locations within the water vessel in a similar manner. Although the system 200 is shown having only two redundant valve triggers 206A, 206B from the Y split from the gas manifold 202, those skilled in the art will appreciate that further splitting the gas line from the manifold 202 can afford additional redundant valve triggers in the same manner. Those skilled in the art will also appreciate that alternate suitable line and valve sizes and types may be employed consistent with embodiments of the invention.

3. Exemplary Omnidirectional Valve Trigger for Flotation System

FIGS. 3A-3F show schematic diagrams illustrating example omnidirectional valve triggering such that the valve is activated with water rising within the vessel in any orientation. From the second branch of the Y split ¾" hose, there can be a ¾" ball valve located which has a flexible link 212 (e.g. lanyard or chain) attached to the end of the handle of the ball valve 206A (to provide maximum leverage) which then feeds through a round eyelet type 0 ring 214 with a couple inches of lanyard and is then coupled to a free swinging spherical float 216. When the internal water level rises above the pre-determined critical comfort level, the attached float 216 in the rising water begins pulling open the ball valve in the ¾" hose line by the flexible link. Tension on the valve handle at the end is predetermined by the fixed relative location of the handle end and the ring 214.

Figure 3A:
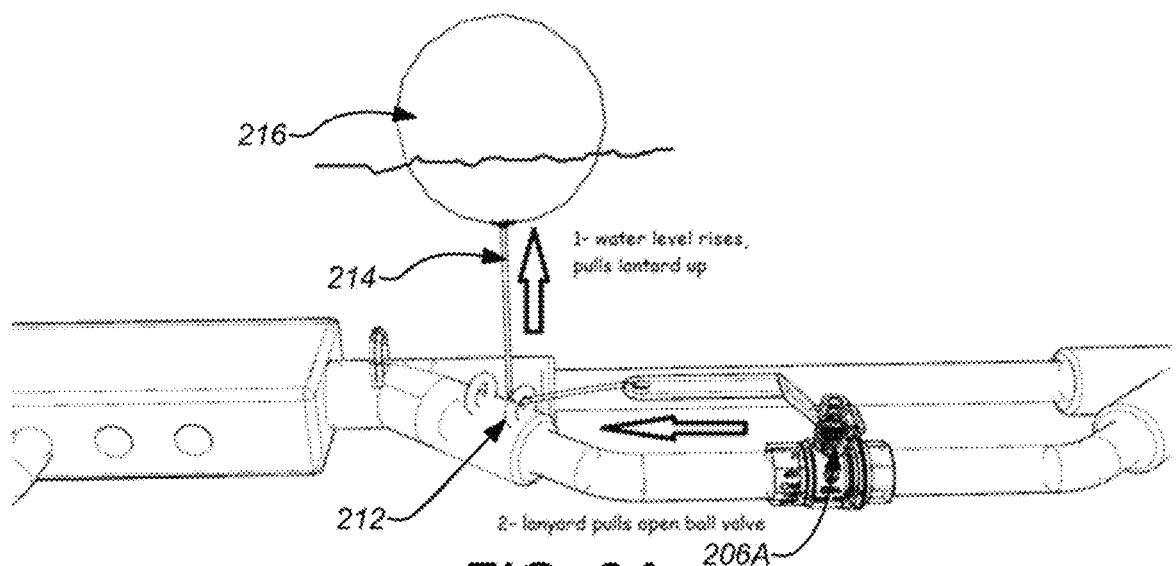
FIGS. 3A-3F show schematic diagrams illustrating example omnidirectional valve triggering.
Figure 3B:
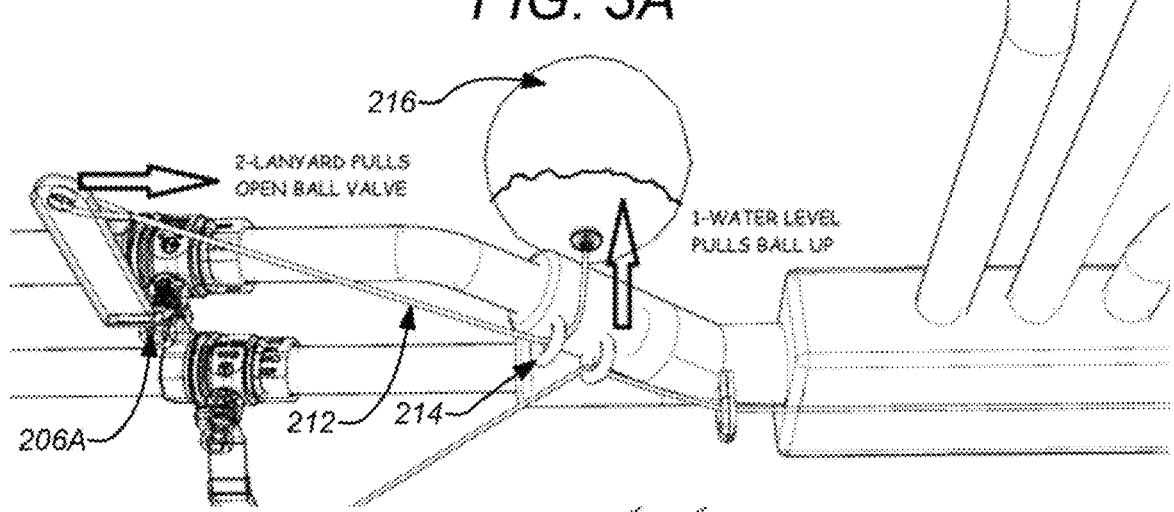
Figure 3B:
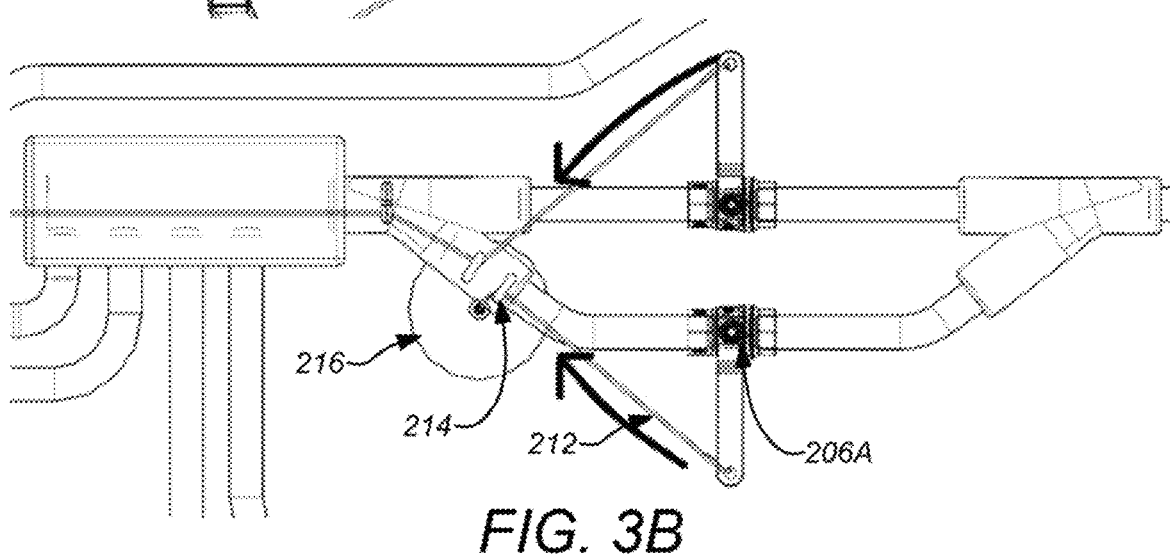
Figure 3C:
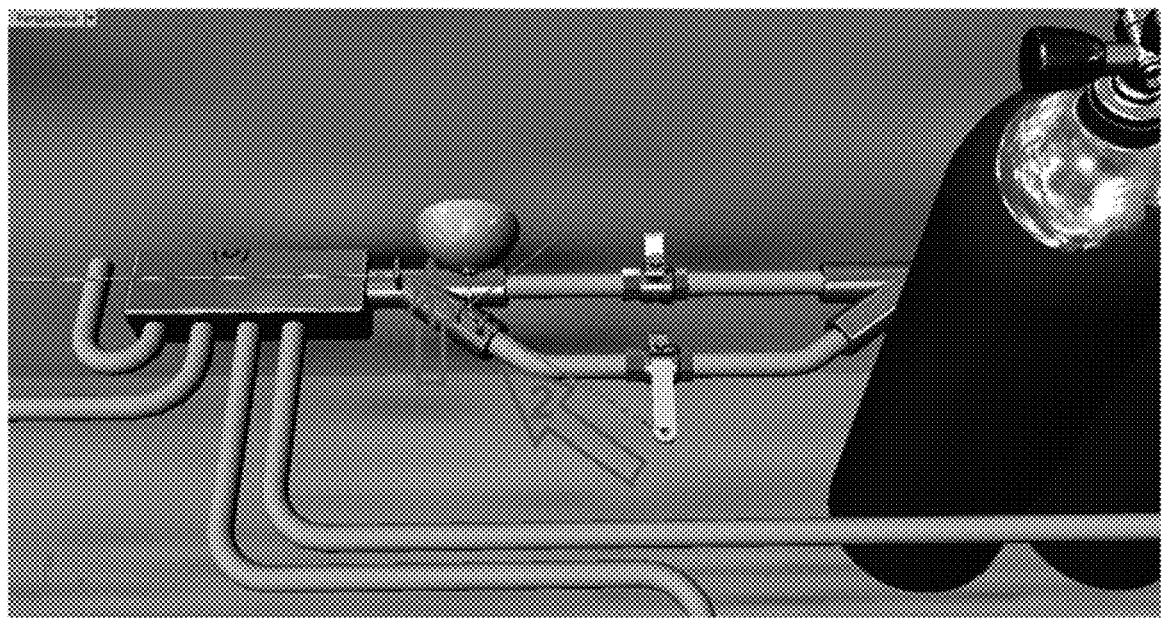
Figure 3D:
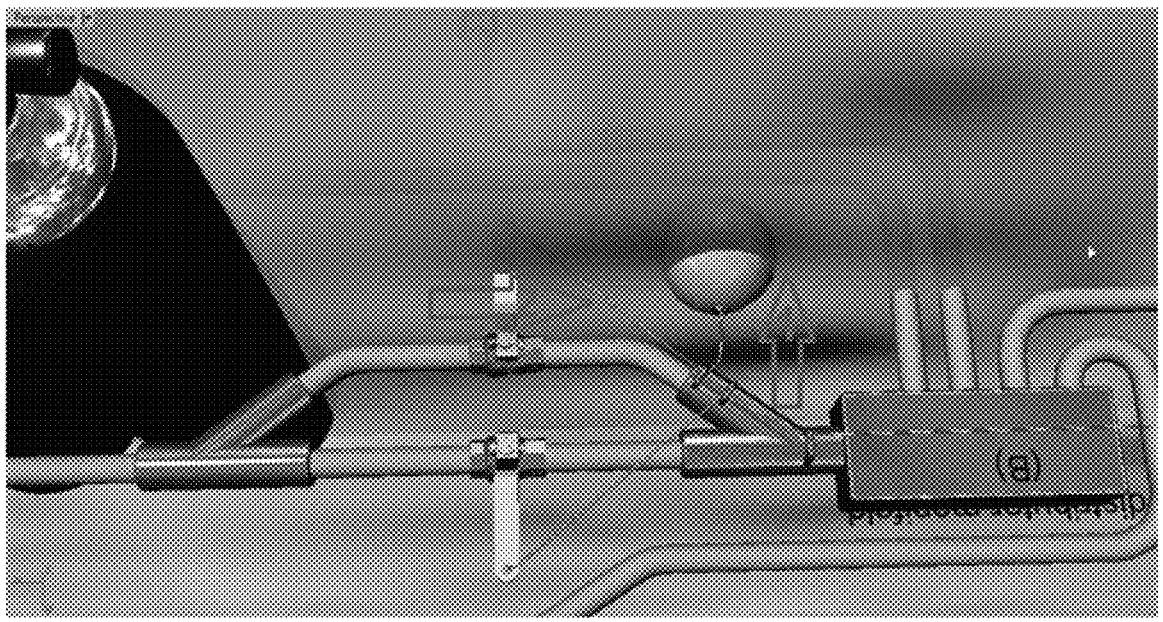
Figure 3E:
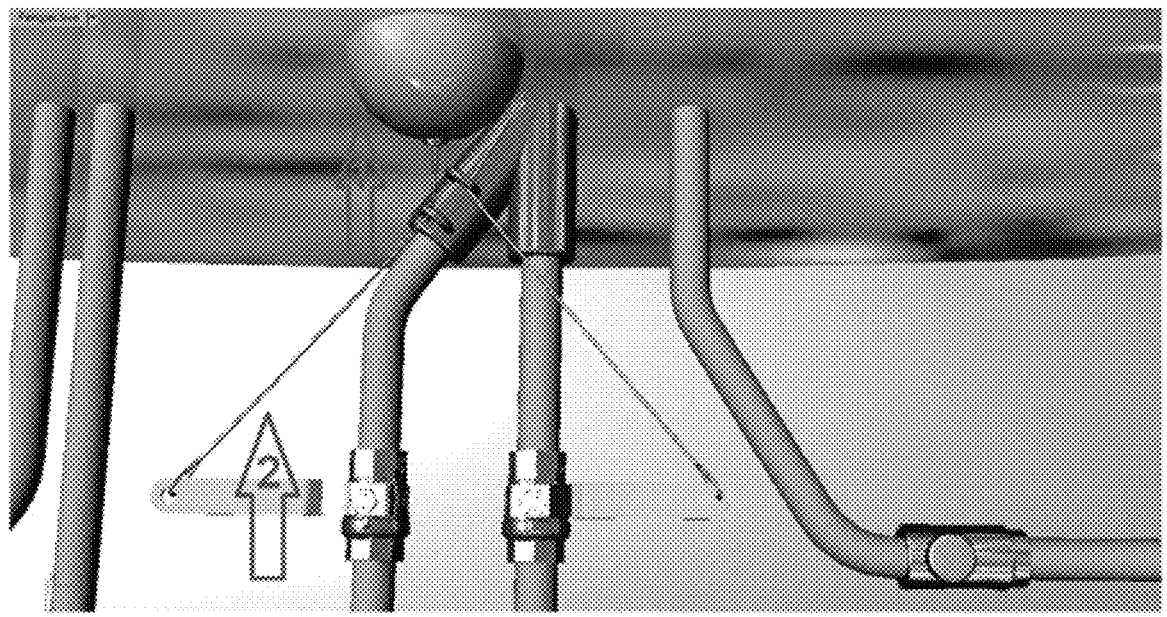
Figure 3F:
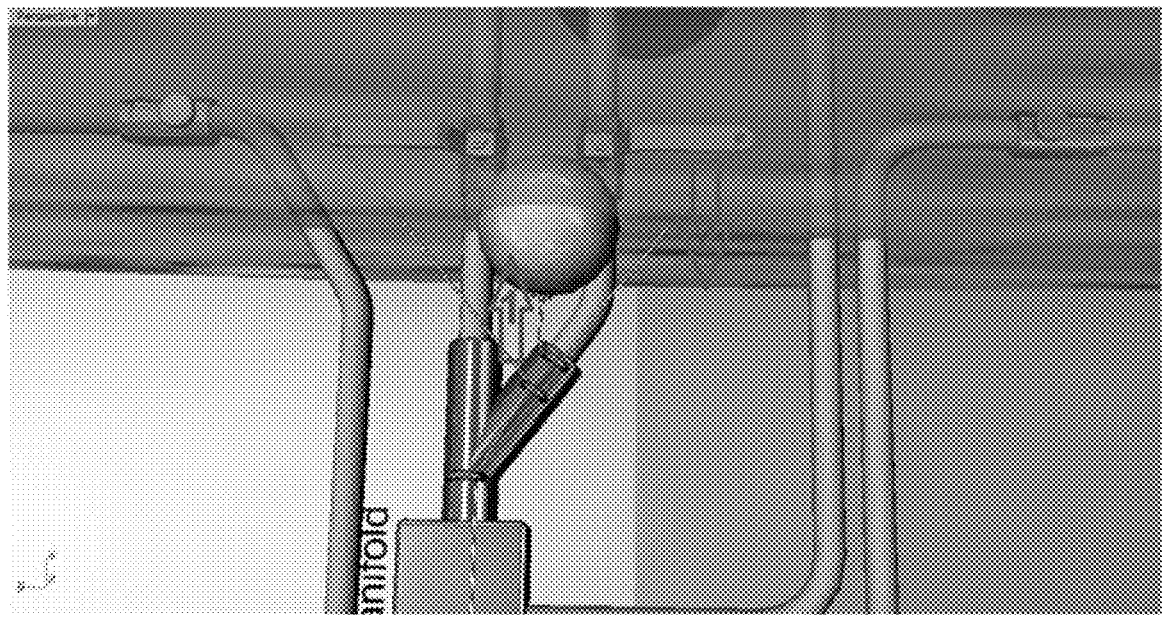

FIG. 3A illustrates a valve 206A in the open position after being triggered by the float 216 in rising water with the level above the plumbing as shown. This corresponds to water rising within the hull with the vessel (corresponding to the example of FIG. 1A) in the upright orientation. This unique automatic omnidirecitonal float switch is specifically designed to trigger even if the vessel should capsize immediately from a rogue wave. FIG. 3B shows the valve 206A being similarly triggered from rising water acting on the float 216 with the vessel in a capsized orientation from two different views. The lower panel also shows the two separate handles of the two redundant valves 206A, 206B which have attached lanyards 212 passing through the separate eyelet rings 214. The secondary float 216 is not shown because its lanyard is directed through its eyelet ring 214 and then to a distal location beyond the manifold 210. One or more additional eyelet rings 214 can be used as necessary to support the lanyard to the distal location. Ideally, the eyelet rings can be disposed conveniently affixed spaced apart along the gas line plumbing. Alternately, the lanyards 212 can be replaced with a sheathed cable as known in the art. FIGS. 3C and 3D show the valve 206A also being triggered but with rising water acting on the float 216 with the vessel tipped to the starboard and port sides, respectively. Finally, FIGS. 3E and 3F show the valve 206A being triggered but with rising water acting on the float 216 with the vessel tipped with the bow down and stern down, respectively. A classic float switch would not release the air to the bladders because it only works when the vessel is upright taking on water. The location of the omnidirecitonal float switch is critical in order to allow the ball to swing freely. The higher the allowable "water level" before triggering, the more free space will be required above the location of the float trigger.

The outlets of the two ball valves are coupled together at a second Y fitting. This configuration provides redundant operation for the system—activation of either valve will release the compressed gas into the bladders. Further redundancy can be achieved by adding a additional valves (manually operated, omni float triggered or any other type of triggering) in parallel in the same manner. The two water level trigger mechanisms, both ¾" hoses converge at the second Y which is then directed to the second manifold, i.e. the distributor manifold. From the second Y join, the ¾" hose is coupled to the distributor manifold. From the distributor manifold the air under pressure is directed into the four ¾" hoses which then fill the feeder hoses to the bladders.

The feeder hoses; from the distributor manifold these hose lines are laid inconspicuously below the sole and behind joinery connecting the air bladders to the compressed air source. At the end of each of the "feeder air hoses" there is another check valve, and then they are coupled to the air bladders. The quantity of hoses can be fewer or more depending on the size and displacement of the vessel.

4. Exemplary Inflatable Bags and Structural Elements for Flotation System

FIGS. 4A-4H show schematic diagrams illustrating example inflatable bag anchoring. FIGS. 4A-4D show some example inflatable bag anchoring using standard rings mounted to various vessel structural elements. The inflatable bags can be secured to these rings using screw pin anchor shackles. One anchor shackle can be secured to a strap which has the opposing end fastened to the inflatable bag. Another anchor shackle can be used to link between the anchor shackle secured to the strap and the ring secured to the vessel structure. Each inflatable bag can be secured with two or more straps in this manner.

Figure 4A:
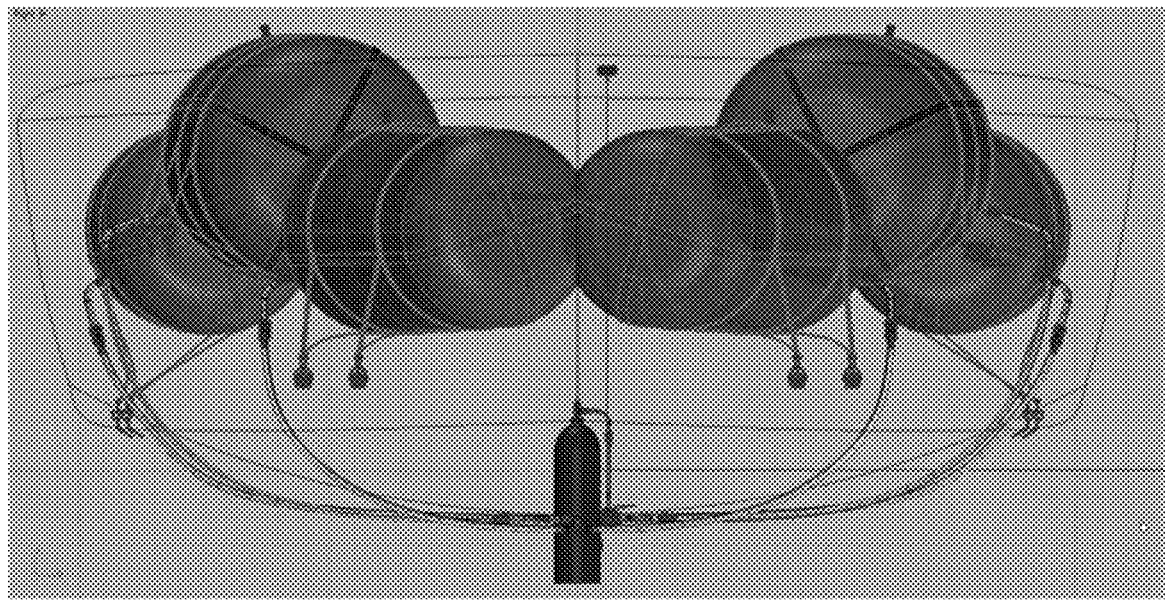
FIGS. 4A-4D show some example inflatable bag anchoring using standard rings mounted to various vessel structural elements
Figure 4B:
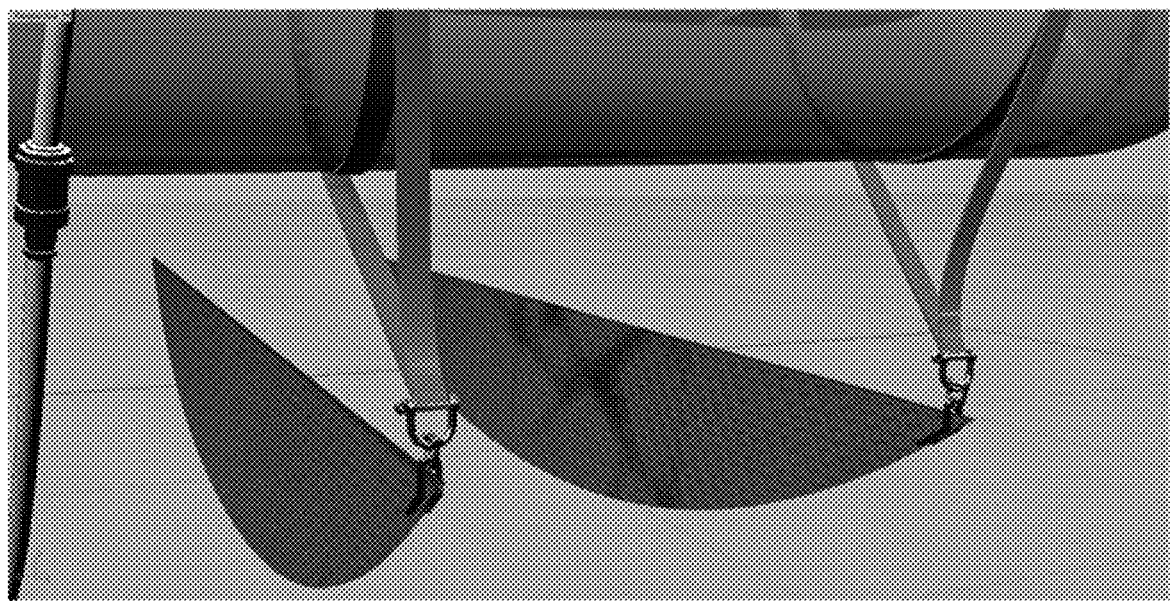
Figure 4C:
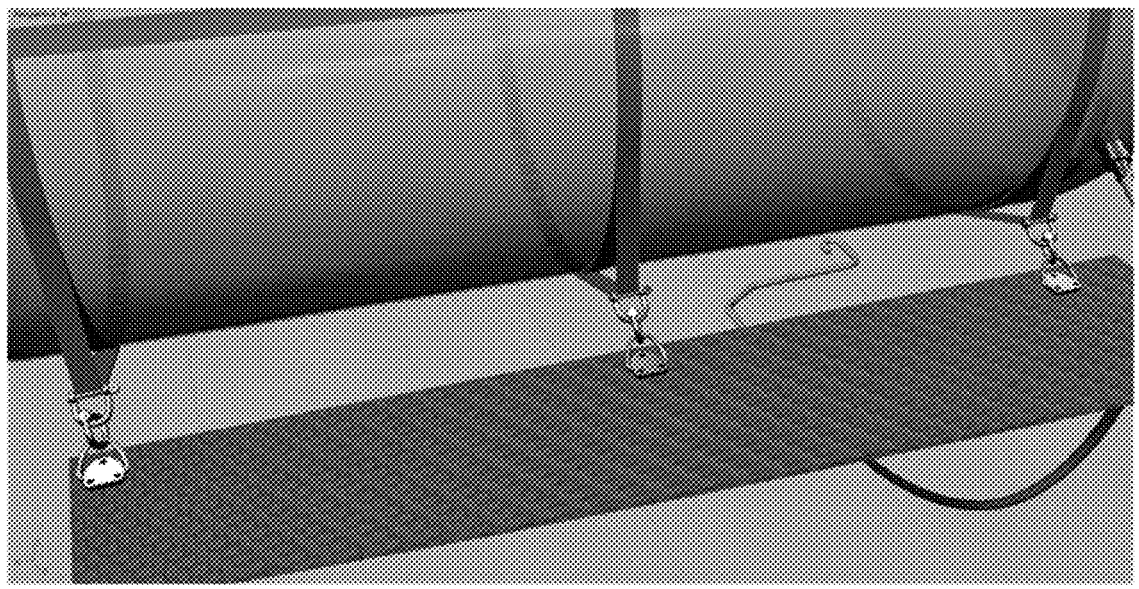
Figure 4D:
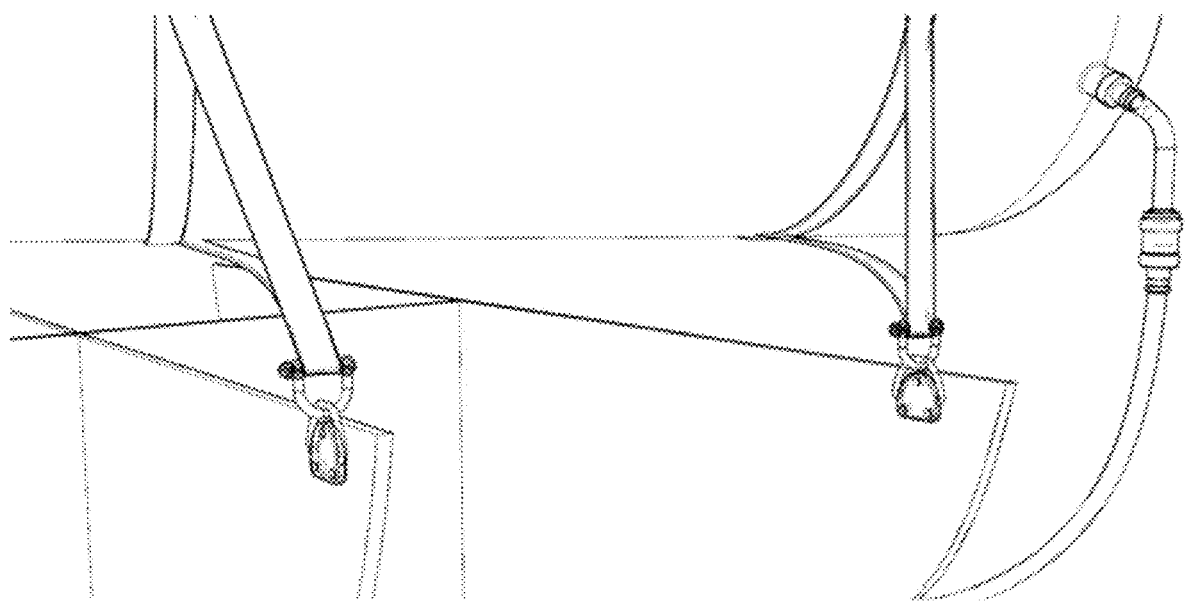
Figure 4E:
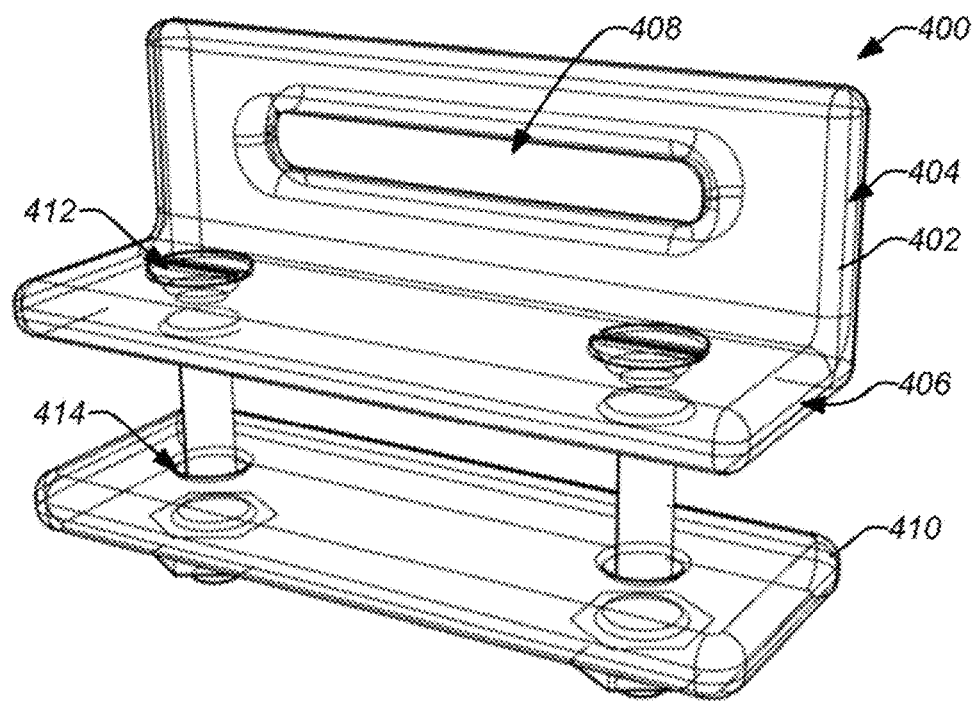
FIGS. 4E-4G show schematic diagrams illustrating a novel anchor plate to secure to vessel structure and support inflatable bag anchoring.
Figure 4F:
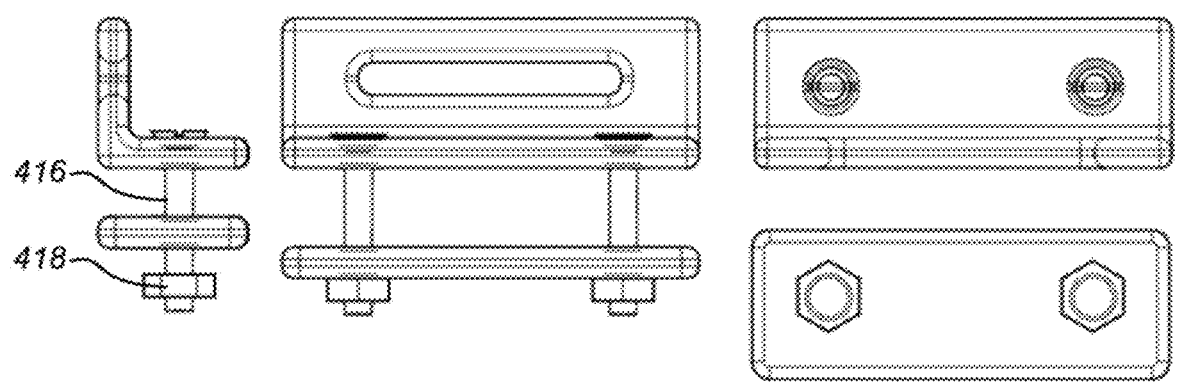
Figure 4G:
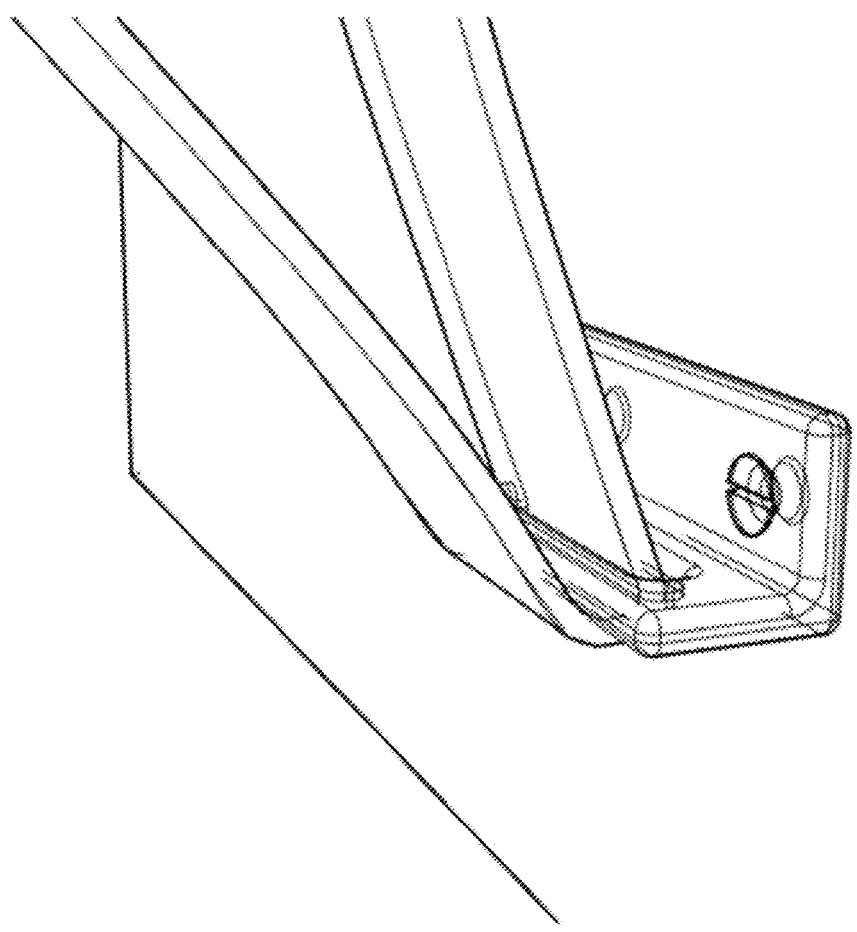
Figure 4H:
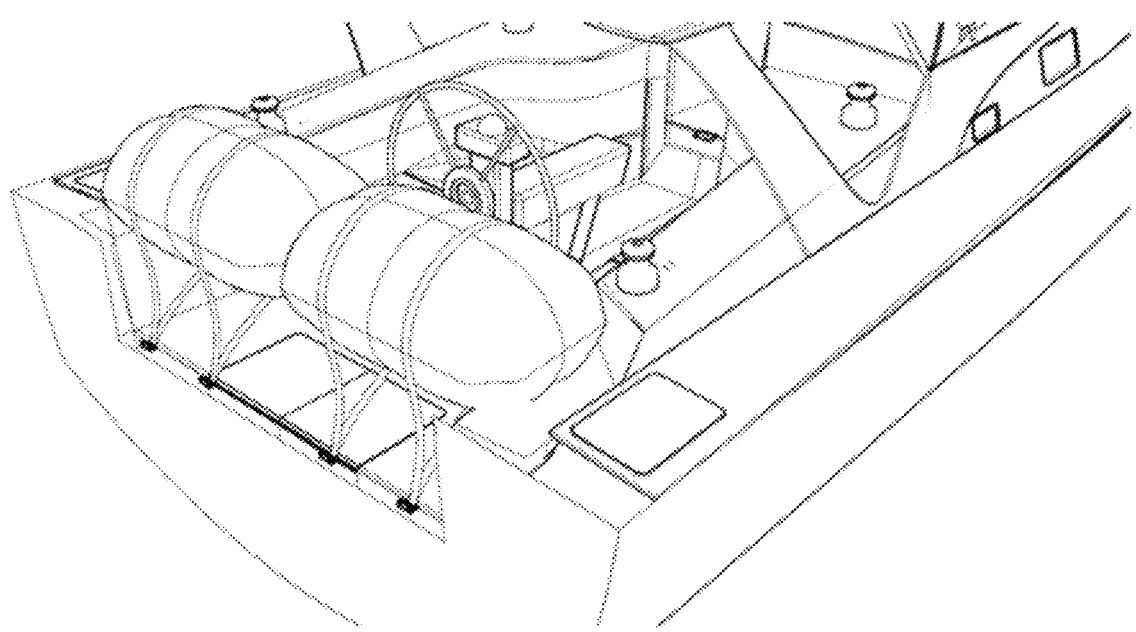
FIG. 4H shows the novel anchor plate used to secure inflatable bag to aft hull of the vessel structure.

FIGS. 4E-4G show schematic diagrams illustrating a novel anchor plate 400 to secure to vessel structure and support inflatable bag anchoring. The anchor plate 400 comprises a L bracket 402 which has an elongated hole on one panel 404 and a pair of fastener holes 412 on the adjacent panel 406. The size and spacing between the pair of fastener holes 412 match the size and spacing of fastener holes 414 on a backing plate 410. The anchor plate 400 is installed through a flat material section of the vessel having a defined thickness using a pair of screws 416 sized for the thickness of the material. Holes are drilled through the material spaced to match the pair of holes 412, 414 in the L bracket 402 and backing plate 410. The L bracket 402 is disposed near the inflatable bag to which it will be secured and the backing plate 410 is installed with the vessel material sandwiched therebetween by the screws 416 and nuts 418. The novel anchor plate 400 disperses the pull force to spread the load safely on stringers, girders, bulkheads, outdoor lazzarettes, and even fiberglass structural components. Adjustable screw bolts allow them to be anchored to different thickness of said locations vertically and horizontally. FIG. 4H shows the novel anchor plate in an example installation used to secure inflatable bag to aft hull of the vessel structure. Those skilled in the art will appreciate that the anchor plate 400 can be installed to create anchor points for inflatable bags at appropriate locations in the cockpit, below seating, aft deck, gunwales in a range of vessel types including classic motor boats and trawlers. The anchor plate 400 can be installed at vertical joinery/fiberglass surfaces or even floorboards hiding stringers and girder structural points.

Figure 5A:
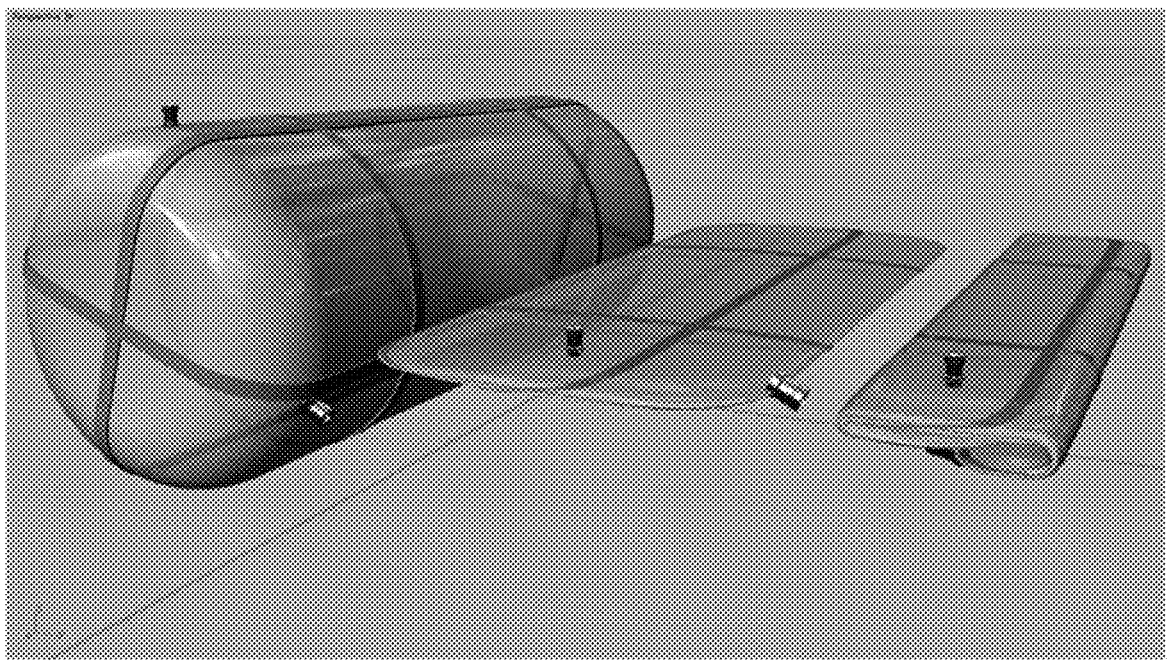
FIGS. 5A-5C show schematic diagrams illustrating example inflatable bags in stored and inflated conditions.
Figure 5B:
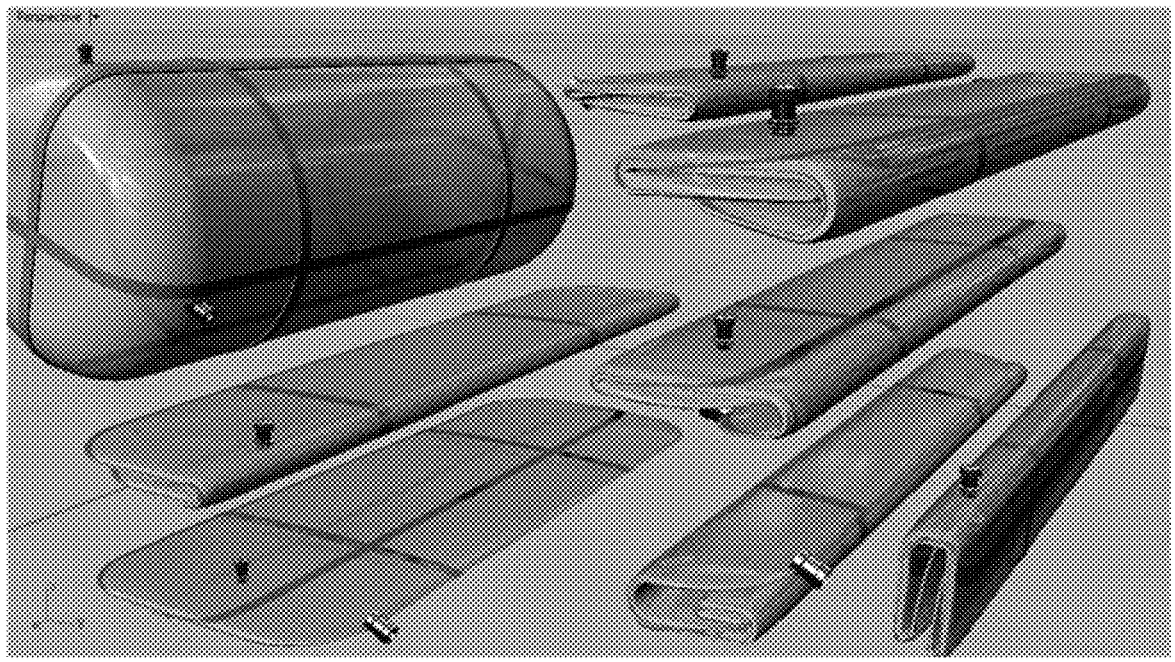
Figure 5C:
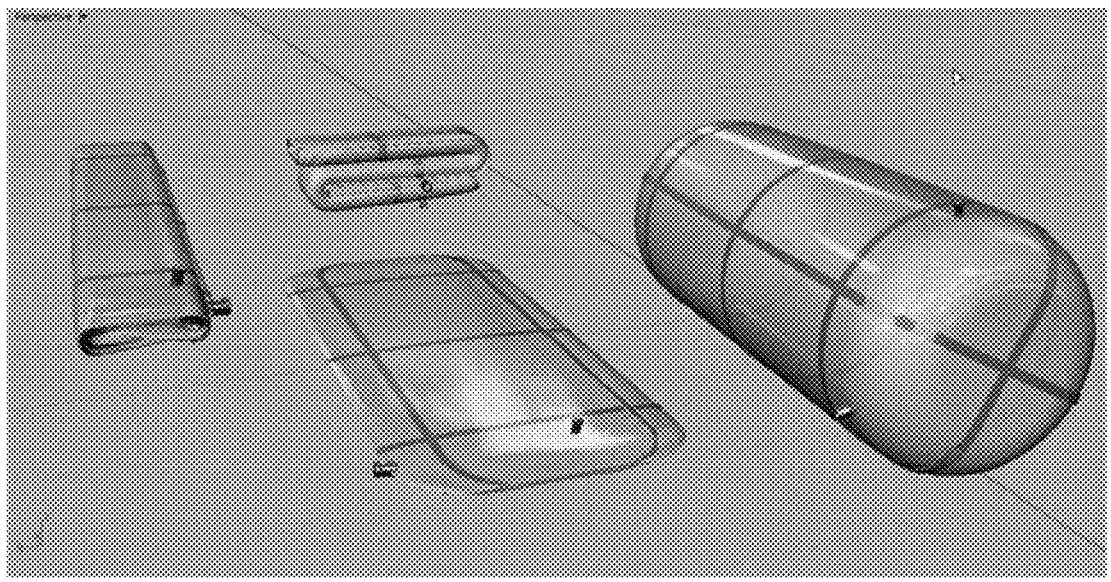

FIGS. 5A-5C show schematic diagrams illustrating example inflatable bags in stored and inflated conditions. The bladders can be made from any suitable rubberized or rubbery material, heavy-duty pliable rubber, coated canvas, or welded PVC—but not limited to those materials. In some embodiments, surface flotation bladders can be constructed using lightweight coated vinyl since such bladders need to be folded into flat packages to be kept secured in discrete locations. Such surface flotation bladders are not heavy duty vessel salvage lift bags which can be employed in alternate embodiments of the invention. The cockpit, deck and inside gunwale locations can employ a UV protective cover for the bladders that discreetly allows these bladders to stay in place without needing to remove them when not under voyage.

Figure 5D:
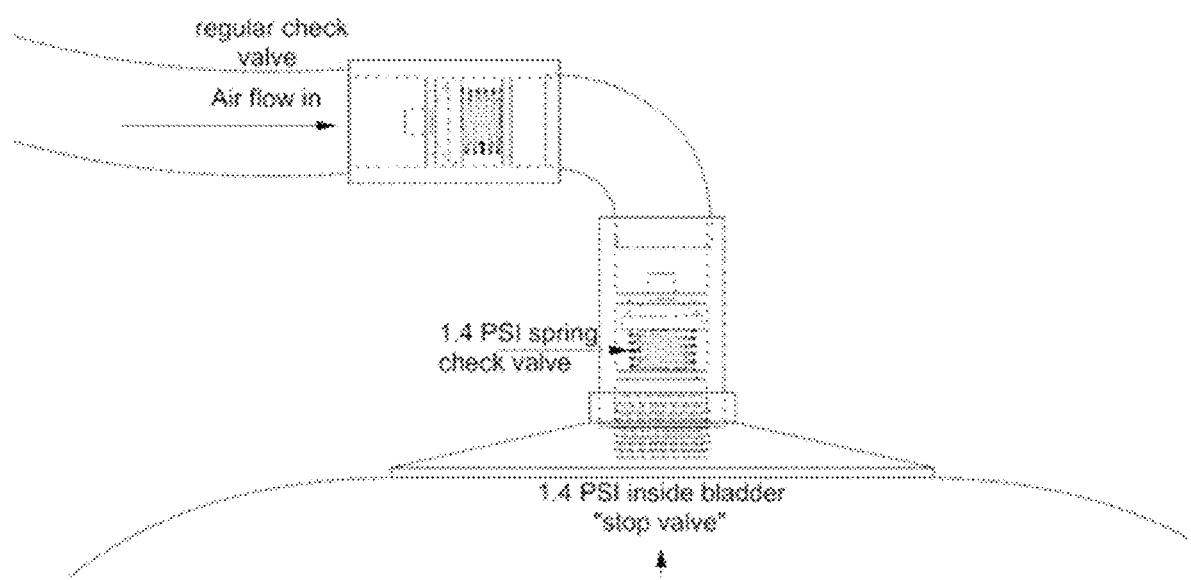
FIG. 5D illustrates a self-contained pressure regulated valve which automatically closes when the pressure within the bladder reaches a defined level.

Each bladder requires a compressed air inlet joint from the gas distribution system where the incoming hose can be attached or detached. Each bladder can be fitted with a pressure relief valve near its top to dump excess air and maintain the proper pressure. FIG. 5D illustrates a pressure regulated valve which automatically closes when the pressure within the bladder reaches a defined level, e.g. 1.5 psi. A pressure regulated valve is positioned in line with the gas supply from the gas distribution system to each bladder. The valve is designed to close once the defined pressure level (e.g. 1.5 psi) is reached to avoid over-inflation and possible destruction of interior components or structures (e.g. tables, shelves, counters, furniture, etc.) These pressure regulated valves also allow any excess air to be maintained in the tanks in the event it is needed for repairs (e.g. external or internal patching of bladders).

In one example, the bow and stern can each have one cubic meter bladder on port and starboard respectively, then amidships have two larger bladders almost two cubic meters of volume available in each, one starboard and one on port. These bladders can be designed for any custom shape for a particular application and are not limited to cylindrical shapes when filled with gas in order to fit in tighter corners or larger open spaces depending upon the particular vessel application.

Figure 5E:
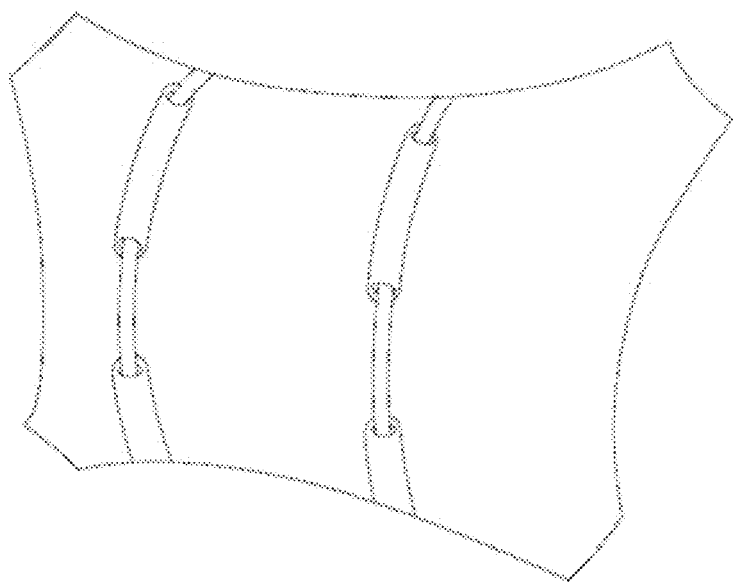
FIG. 5E illustrates an example bladder having a rectangular shape with clipped corners.

FIG. 5E illustrates an example bladder having a novel rectangular shape with clipped corners. Bladder material is cut in to two rectangular shapes having each of the four corners of the rectangle clipped. The edges of the two shapes with clipped corners are then seam welded together to form the closed bladder. Valving and inlets can be installed in the shapes prior to welding the seams. Rectangular, square, and triangle type shapes can be flattened, folded and or rolled into very minimal packages that can be attached with the webbing straps at both interior (cabin) and exterior locations.

Figure 5F:
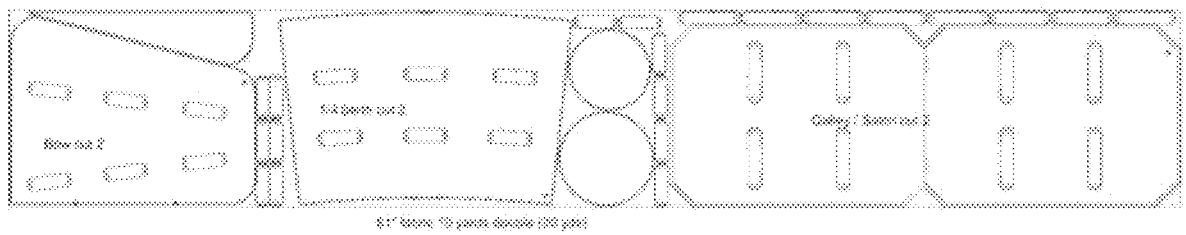
FIG. 5F illustrates an example pattern of sections to be cut from a large material sheet to create a combination of bladders.

FIG. 5F illustrates an example pattern of sections to be cut from a large material sheet to create a combination of bladders. Structure of the bladders can employ a pattern design for secure seam welding manually that is stronger and more efficient than the classic air lift bags. Bladder shapes can include rectangle, square and triangle flat fold shapes with clipped corners to yield a range of fold/roll options for storage on a vessel.

FIGS. 6A-6L show schematic diagrams illustrating various detailed example inflatable bladders stored within an example yacht. In general, the inflatable bladders should be attached to strong structural elements of the vessel. Interior and exterior anchor plates must be located where the backing plates and securing nuts for the anchor plates can be accessed for installation. During installation the bladders can be inflated in the cabin and then webbing installed through the bracket and length adjusted to keep the center of flotation as low as possible. Following this, the bladder is then deflated, flattened and folded or rolled up, and packed discreetly in its storage or under a cover. This inflation check process ensures that the bladders will not burst interior joinery or furniture (e.g. V-berth triangle).

Figure 6A:
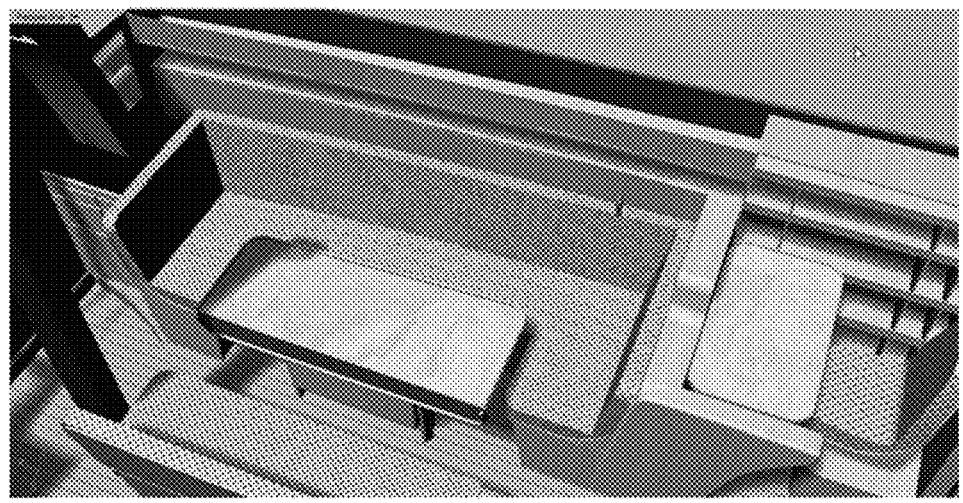
FIGS. 6A-6L show schematic diagrams illustrating various detailed example inflatable bags stored within an example yacht.
Figure 6B:
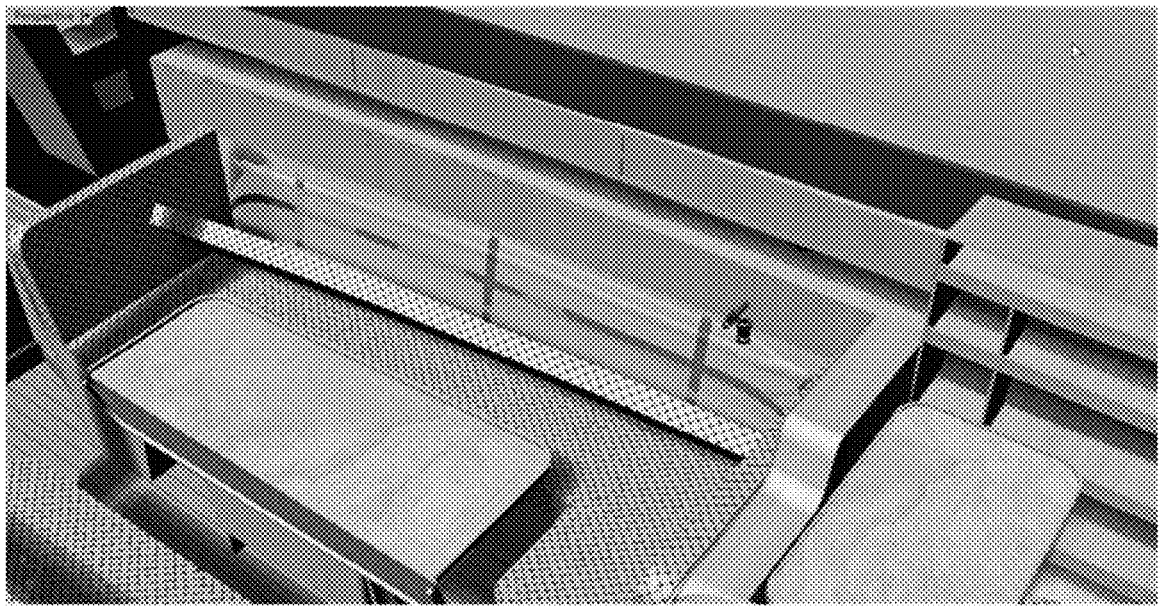
Figure 6C:
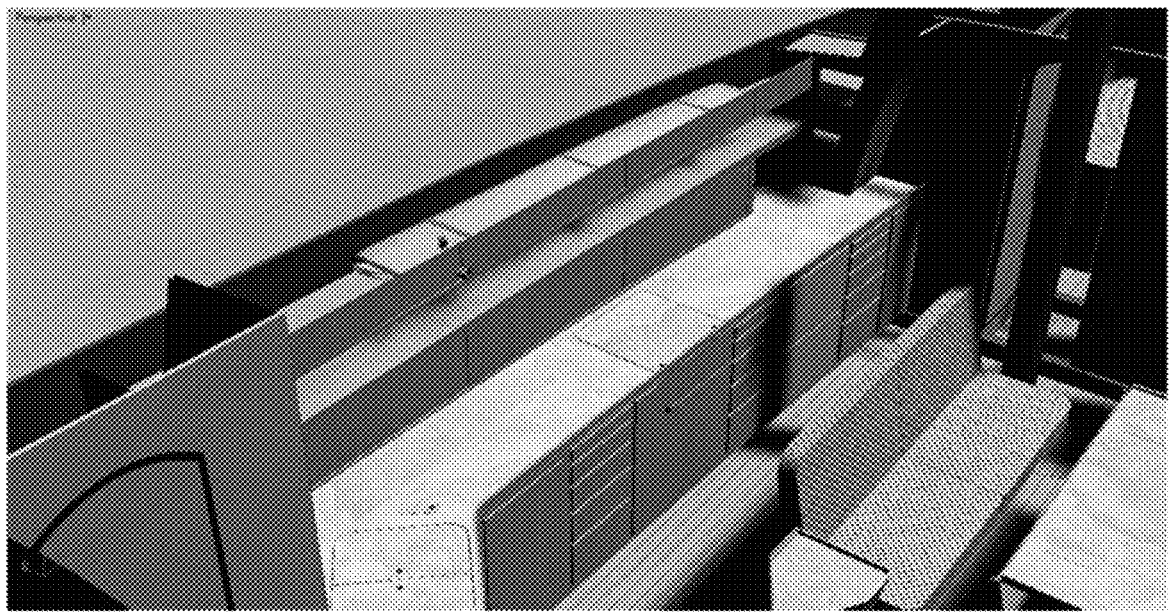
Figure 6D:
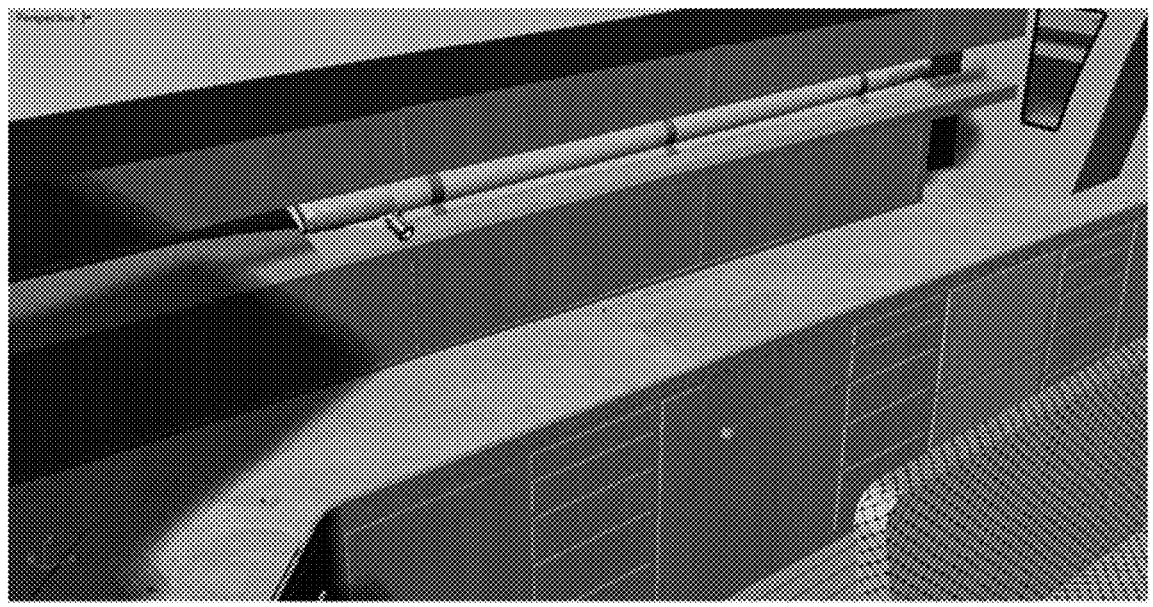
Figure 6E:
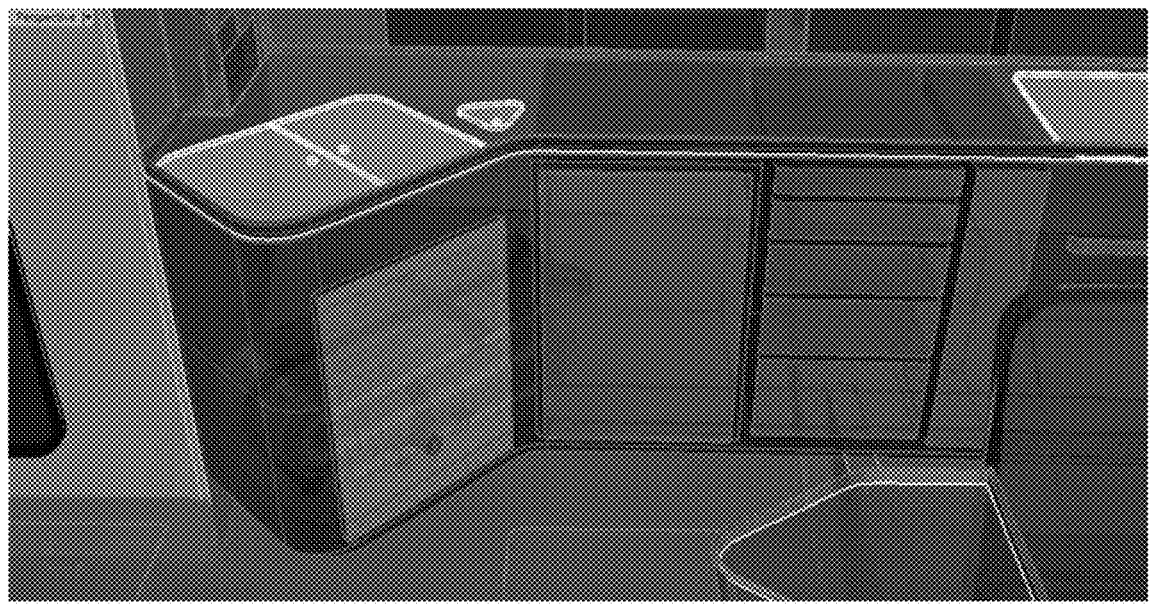
Figure 6F:
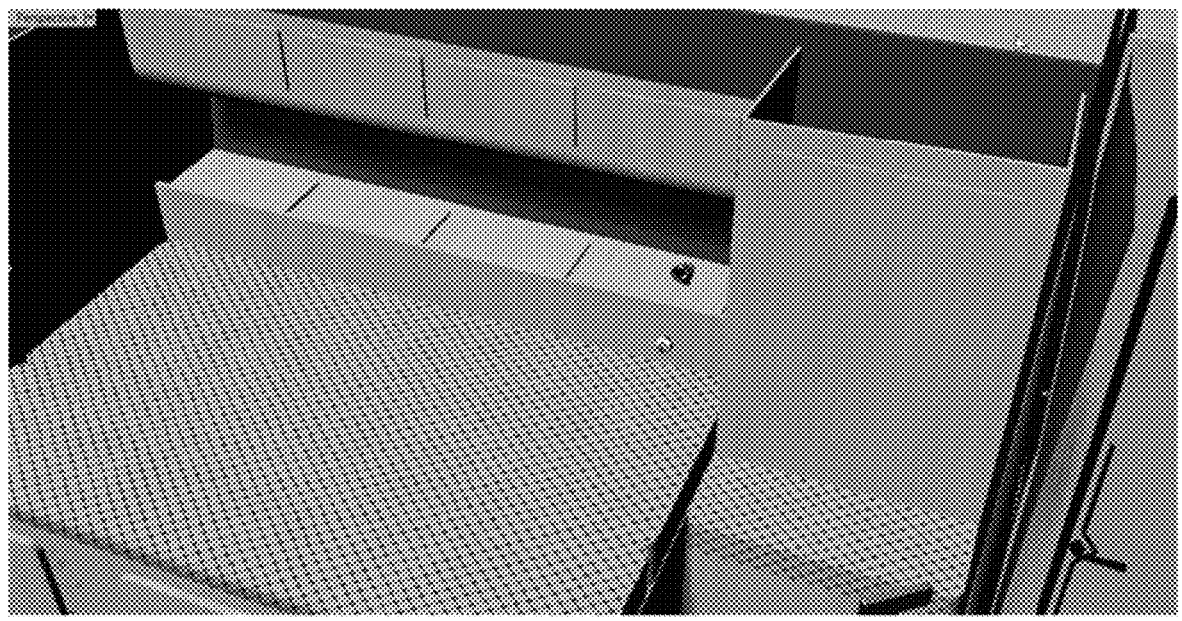
Figure 6G:
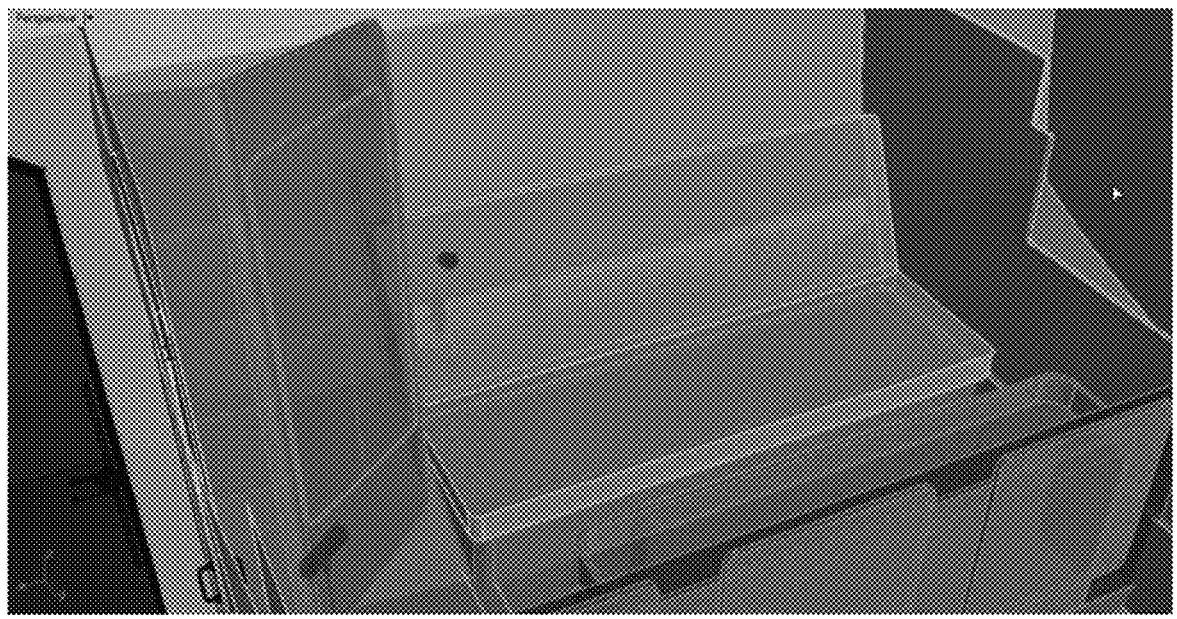
Figure 6H:
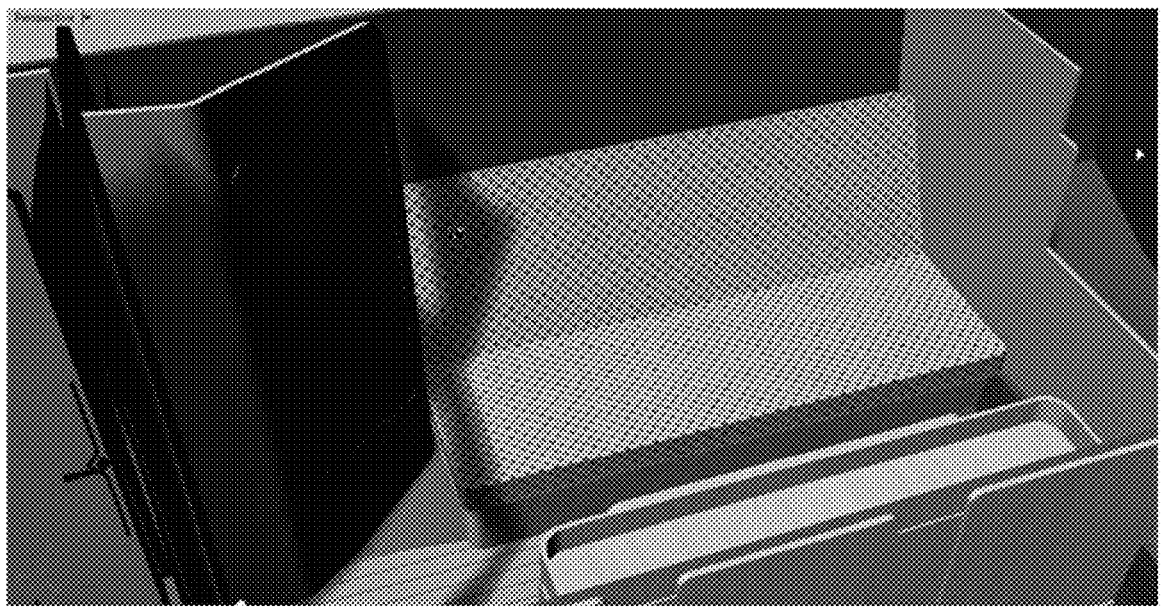
Figure 6I:
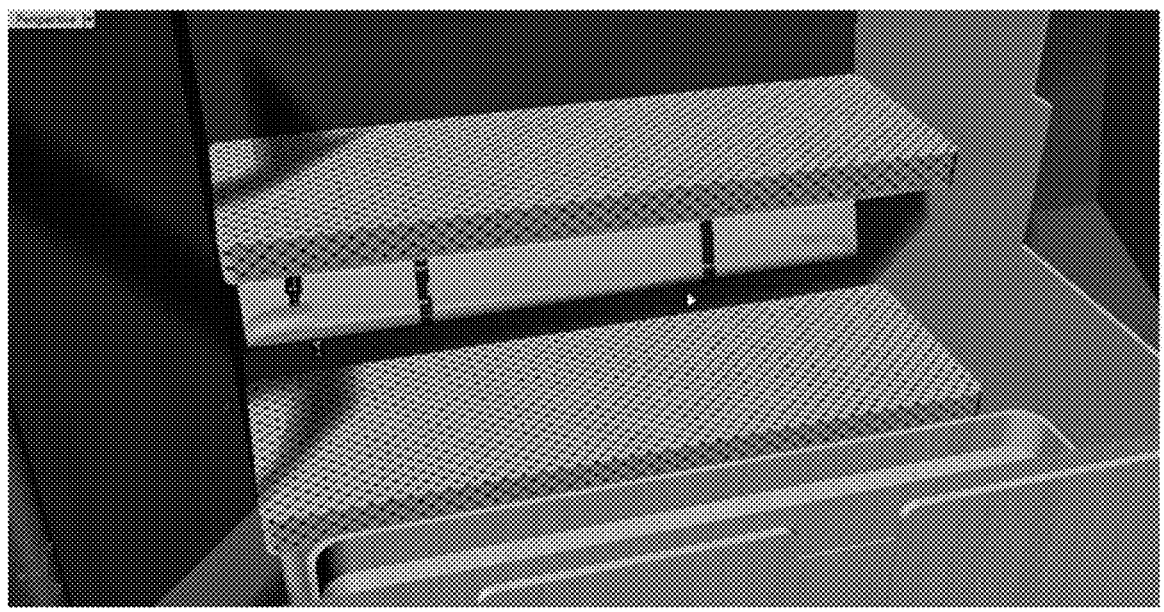
Figure 6J:
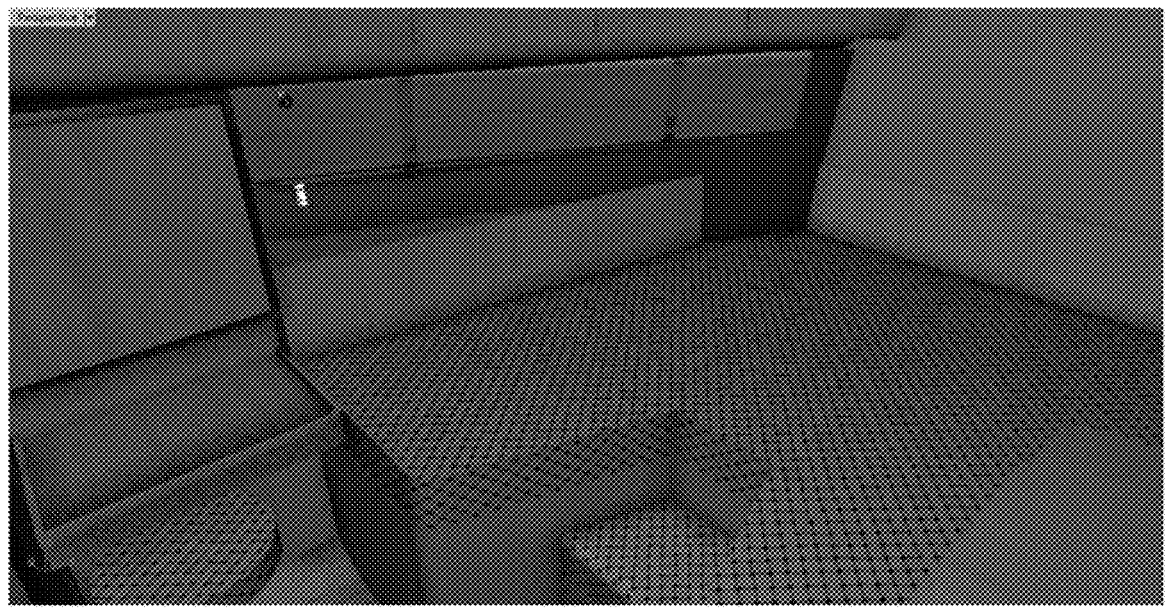
Figure 6K:
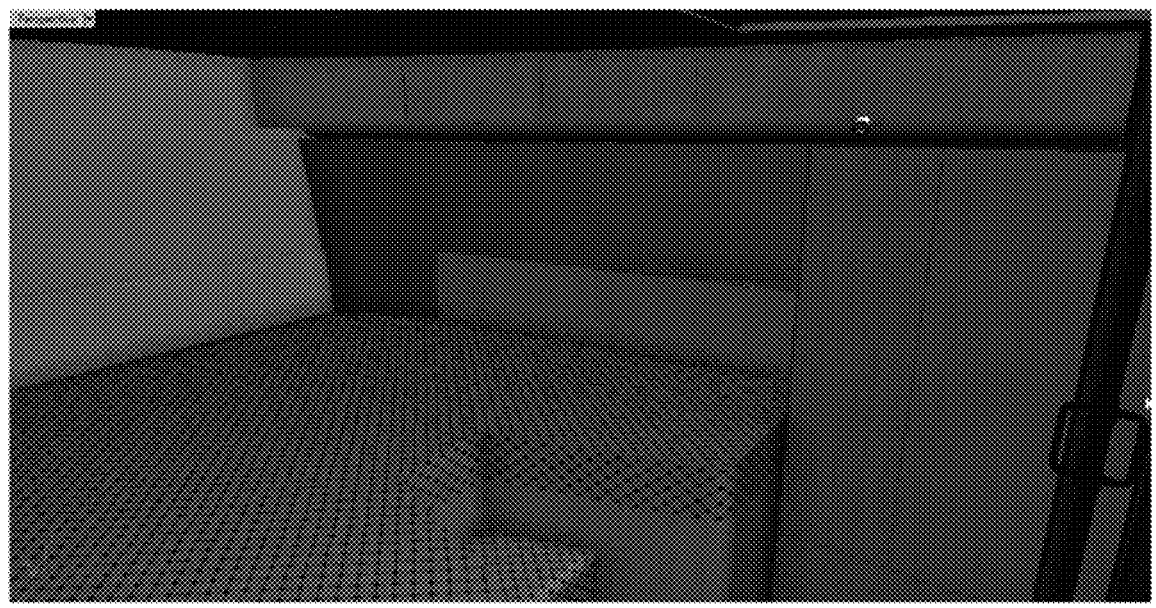
Figure 6L:
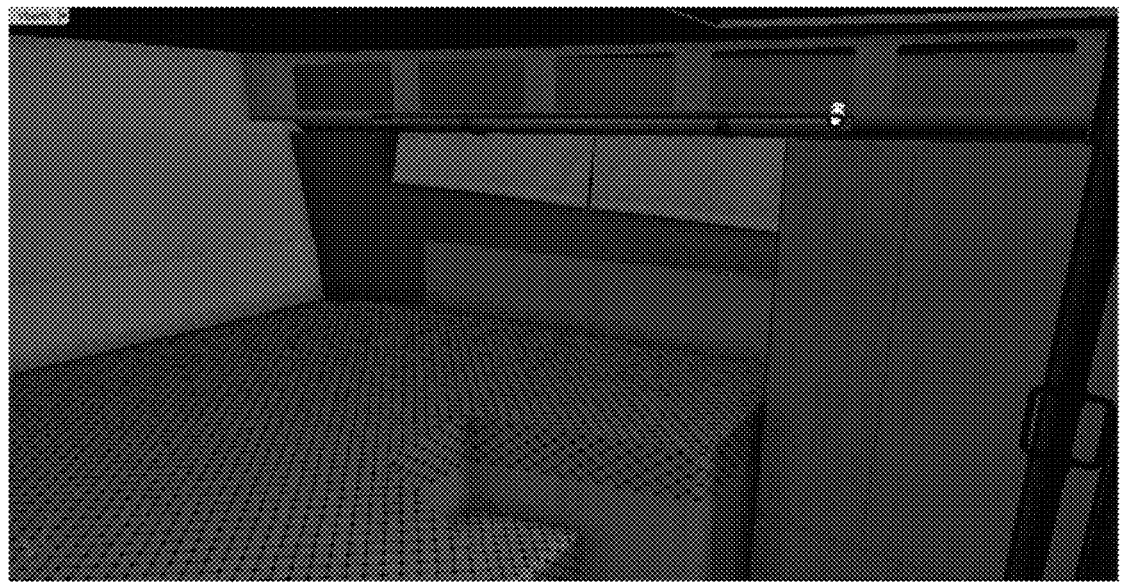
Figure 6M:
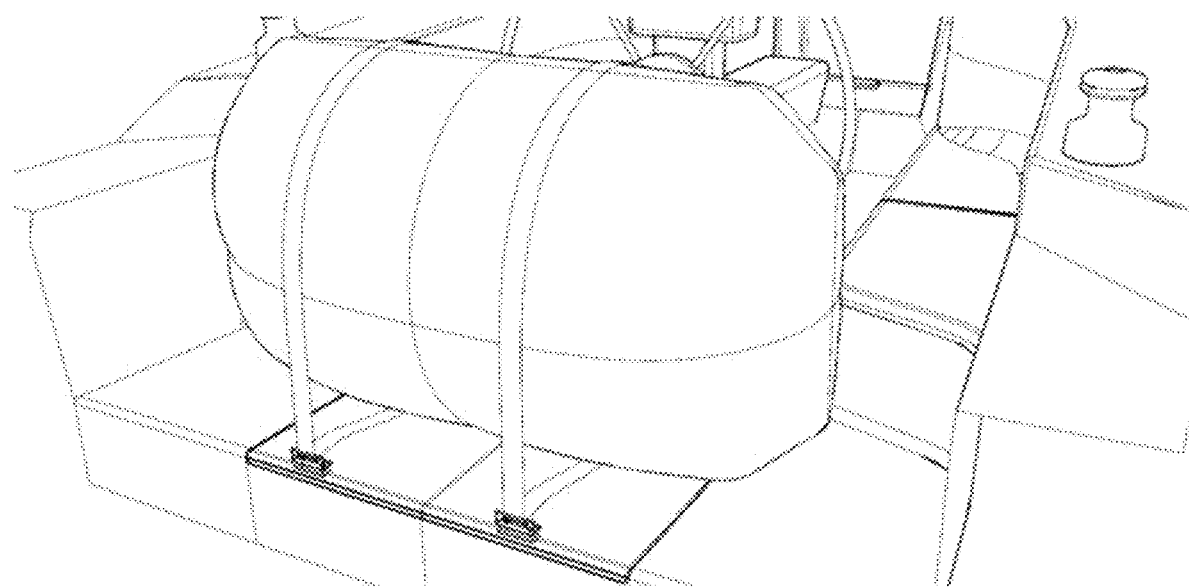
FIG. 6M shows an example bladder formed from a rectangular shape having clipped corners inflated from a stern vessel compartment.
Figure 6N:
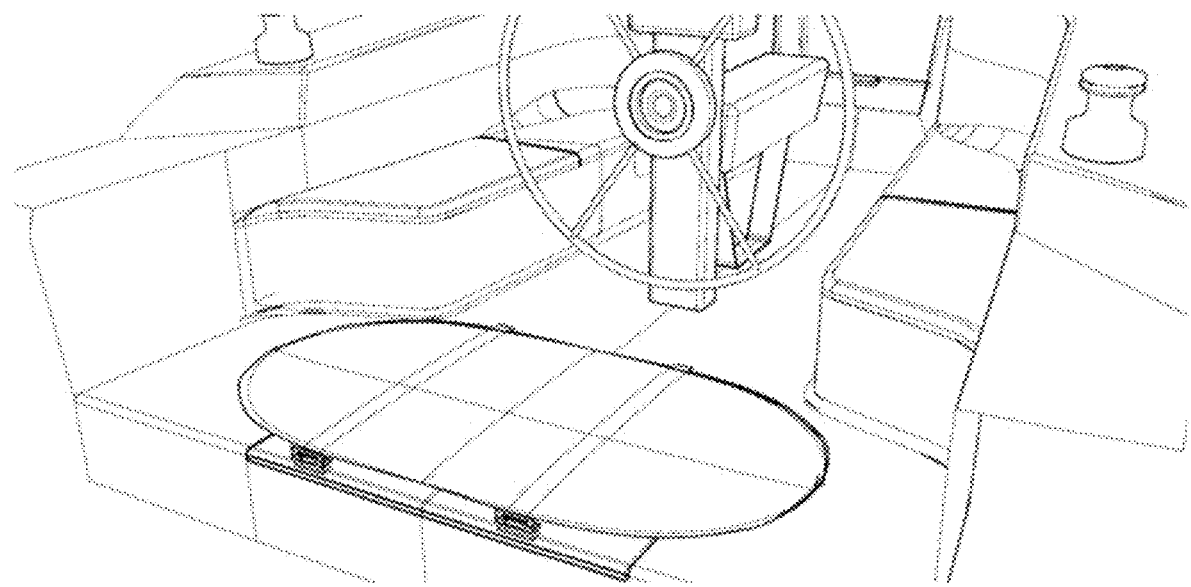
FIGS. 6N-6P show an example bladder folded in steps to be stored in a stern vessel compartment.
Figure 6O:
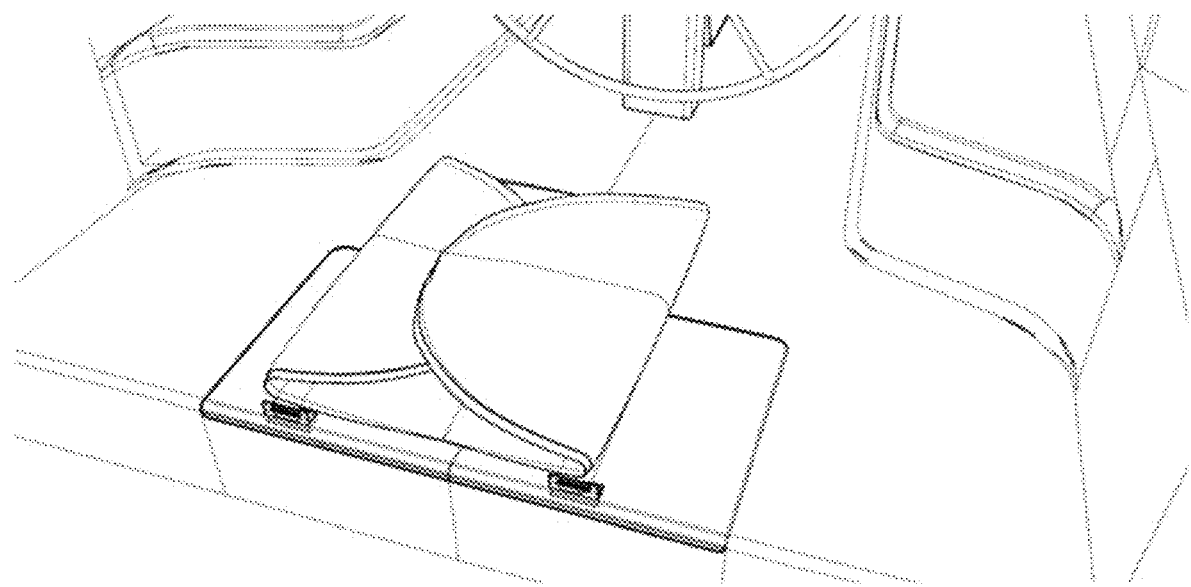
Figure 6P:
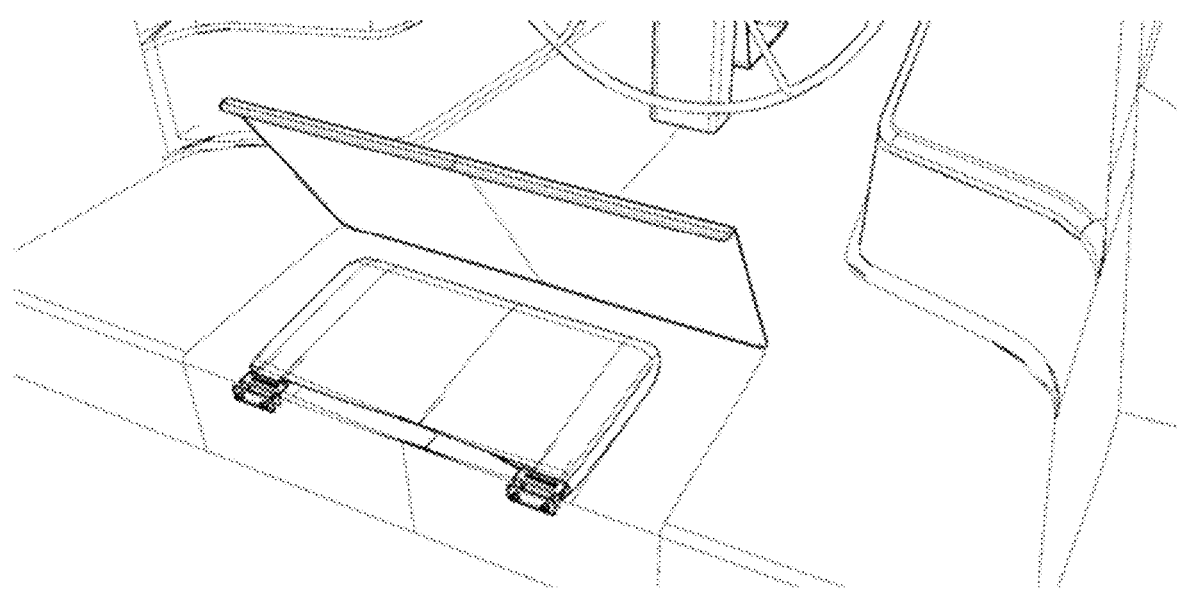
Figure 6Q:
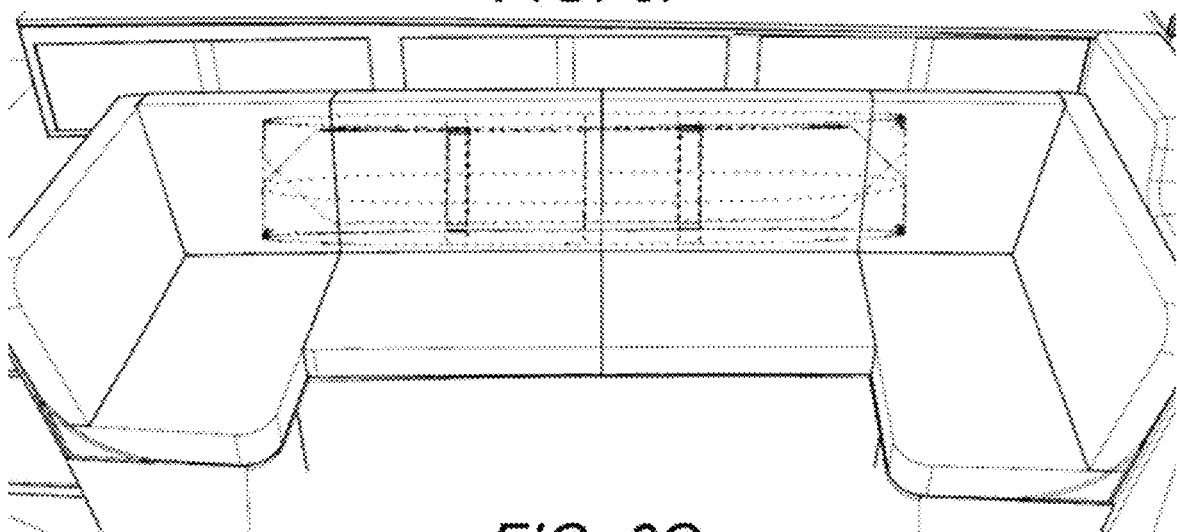
FIG. 6Q shows an example bladder folded into a vessel compartment behind a bench in the cabin.

FIG. 6M shows an example bladder formed from a rectangular shape having clipped corners inflated from a stem vessel compartment below the deck. Straps secure the bladder to anchor plates at the back edge of the compartment. FIGS. 6N and 6O show an example bladder folded in steps to be stored in the stern vessel compartment. FIG. 6P shows a deck panel folded down to enclose the folded bladder within the compartment. FIG. 6Q shows an example bladder folded into a vessel compartment behind a bench in the cabin.

Figure 7A:
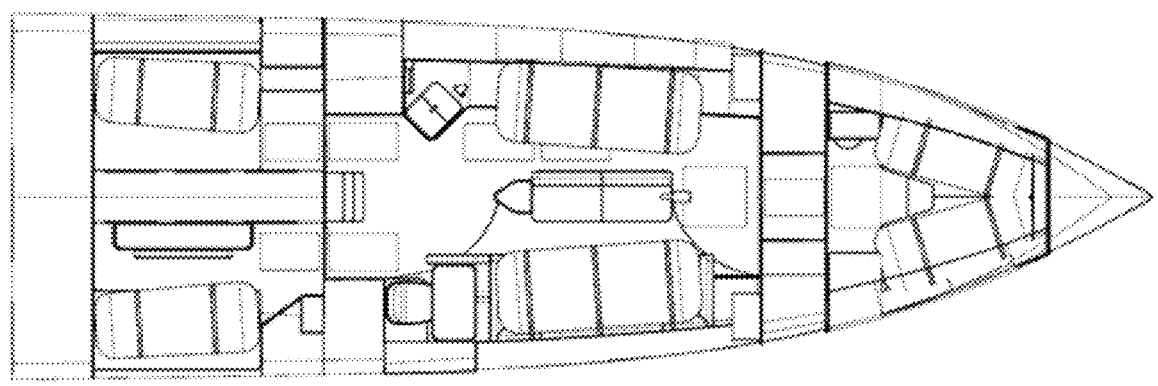
FIGS. 7A-7C shows the example yacht cabin having six inflatable bladders in vector line, three-dimensional, and overlayed line views, respectively.
Figure 7B:
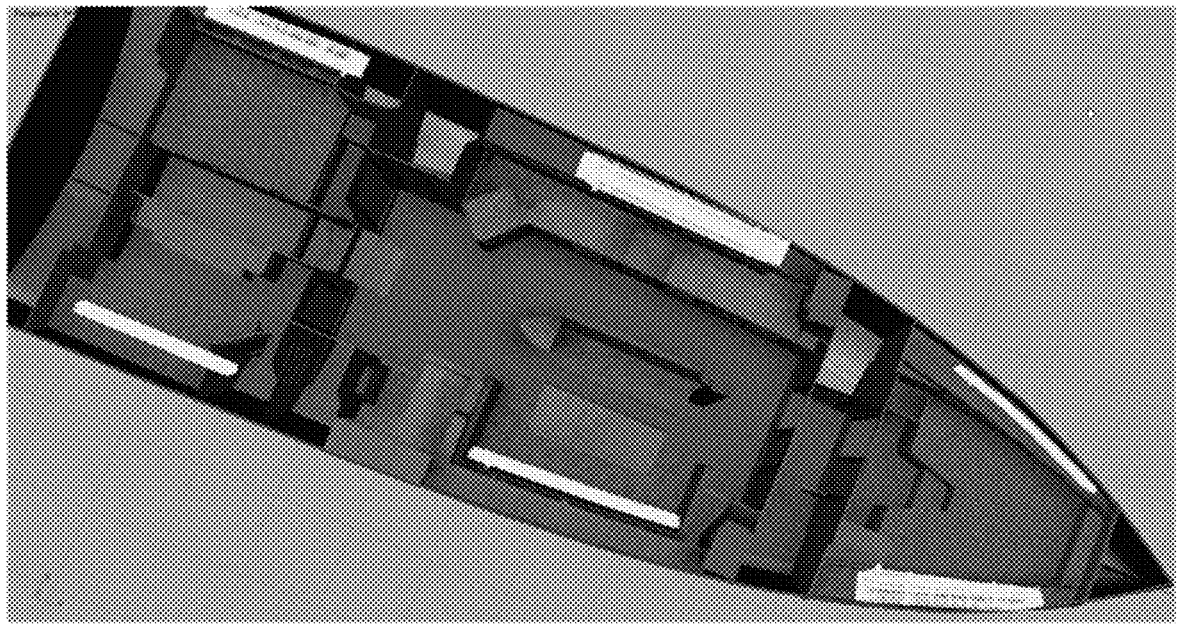
Figure 7C:
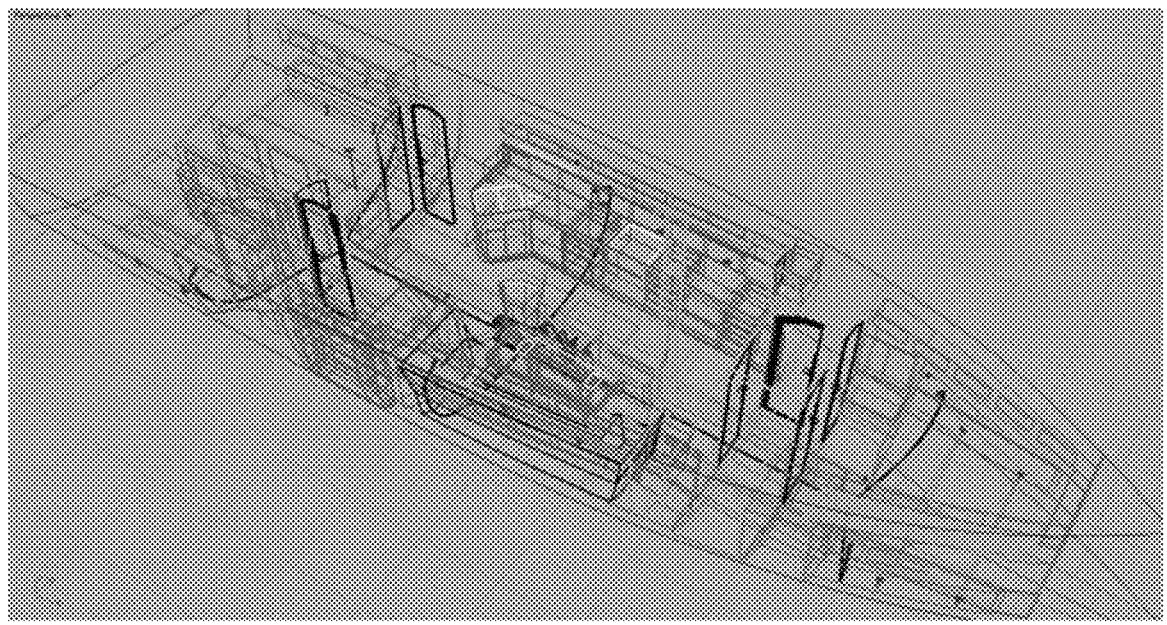
Figure 7D:
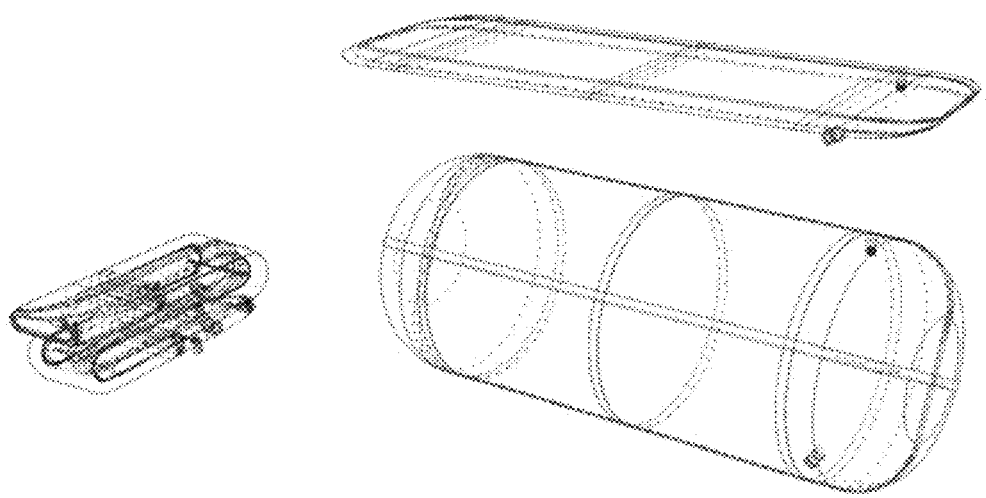
FIG. 7D shows an example cylindrical bladder in flat, folded and inflated forms.
Figure 7E:
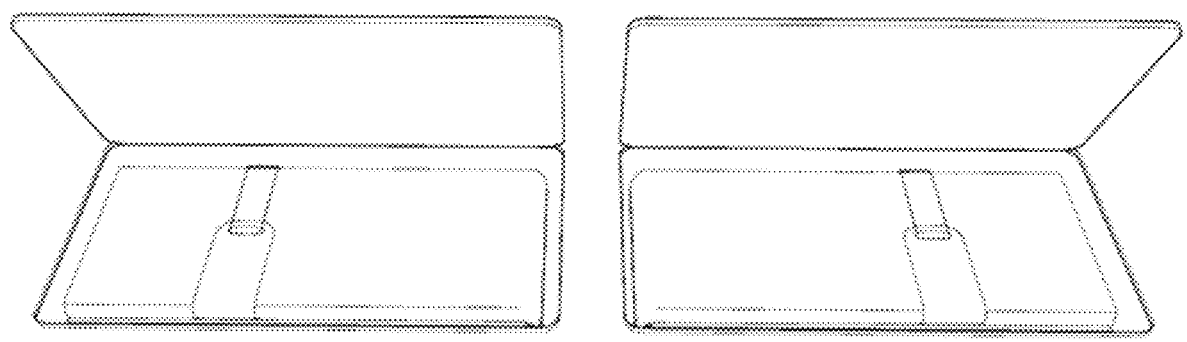
FIG. 7E shows example floorboards inside cabin or outside deck compartments below folding panels to secure bladders.

FIGS. 7A-7E show schematic diagrams illustrating example system of inflatable bladders stored within an example yacht. FIGS. 7A-7C shows the example yacht cabin having six inflatable bladders in vector line, three-dimensional, and overlayed line views, respectively. FIG. 7D shows an example cylindrical bladder in flat, folded and inflated forms. FIG. 7E shows example floorboards inside cabin or outside deck compartments below folding panels to secure bladders.

The position of the bladders can be in many different locations keeping in mind the balance of flotation per the vessel being fitted. Specifically for a mid size vessel of about 50 feet the centers of flotation of these air bladders should all be about waist level or 3 feet high. The deflated bladder storage location is important; they must be stored in parts of the cabin which are devoid of obstacles liable to oppose the inflation or cause the bladders to be punctured.

Rectangular, pillow shaped, square and triangular shaped bladders can be attached with two or three straps slid through the "strap patches" strategically located on the bladder to hold them down while the internal air lifts the structure where they are anchored. Strap patches are material pieces, typically rectangular, having two opposing edges stitched to the bladder material to form a channel through which a strap can be threaded to secure the bladder to an anchor plate. Cylindrical shaped air bladders can be held in place with a webbing cage. For example, there can be two or three straps of 4 cm wide webbing or similar extremely strong strap material (depending on the size of the bladder) around the cylinder crosswise to distribute the buoyant force evenly to the lower straps and anchor points. There can be two lengthwise straps connecting these together to hold the bladder inside. These straps are fed thru tabs or slats on the surface of the bladder that allow the straps a bit of sliding movement while the bladder inflates. The holding straps which are attached to the lower quarter intersecting each of the crosswise straps can be extra long to allow adjustment of the length and height of the bladder and secure it with a either anchor plates or D-rings where they are mounted. The bases of the holding straps can be fed through slots of the anchor plates or attached to carabiner type D-rings with an opening so the webbing straps can be adjusted or detached.

Wide sliders (e.g. 2 inch) or D-rings from the webbing cage can be attached to stainless steel folding D-ring pad eyes or the described anchor plates which can be bolted or screwed into reinforced structural areas distributing the force across the multiple screw bolts. Where the direction of the stringers or bulkhead is not aligned for a pad eye D-ring, a U-bolt can be attached to a steel plate and glassed into the structure if desired. Optionally, an additional shackle will do the job just as well. The anchor points are connected to a structural part of the hull stringers, bulkheads, or fixed to load carrying joinery.

When the bladders are deflated, they can be rolled up or folded in a manner to fit snugly in the designated location as to allow the attached webbing cage to release while inflating. Thus, they can be concealed inside, below or on top of shelves or cabinets. They can also be folded flat behind or even under a cushion and/or attached to a wall or bulkhead with lightweight webbing and breakaway clasps that release with very little pressure. These can then be covered with a piece of fabric or upholstery and a few Velcro (hook and loop) tabs. In the event the drop down shelf is desired, the whole bottom part of the shelf with the front curving at a typical 5-10 cm radius, the back hinge allows this to also gently open and release the bladder to inflate. Bladders can also be folded accordion style and placed in lower cabinets. In addition, bladders can even be directly attached to the stringers and girders (structure of the vessel) below the floor under an access board panel.

Once the automatic or manual valve trigger is activated, it can take between 30 to 60 seconds to fill all the bladders 80% depending on how many tanks, size of hoses and distance of plumbing to reach all the bladders. By 60 to 90 seconds the bladders should be completely inflated. This example fill rate is applicable to the particular configuration shown in the figures based on an approximately 46 ft yacht as depicted in FIG. 1A.

To equalize inflation in the example configuration, the two bladders mid-ships will inflate first because of the shorter hose distance even though they have twice the volume to fill, an inline air restrictor/regulator can be inserted along the hose before the check valve so all bladders will inflate at the same rate. It is critical that all the bladders inflate reasonably simultaneously to avoid a dive or capsize. If not, the bow may rise before the stern or port before starboard once again. Managing relatively even inflation is the purpose for the merger and distributor manifolds.

Because the air tank capacity exceeds what is needed to fill the bladders, there is a stop flow mechanism (pressure regulated valve) in line on the air input valve (on the bladder) similar to an over-pressure relief or dump valve regulated to shut off the intake at 1.5 PSI. The classic relief or dump valves only allow the air flow out once the internal pressure hits 2.5 PSI. This would render the bladder far too hard/solid for any interior because the bladder will continue to expand and may actually damage internal shelves, tables, even bulkheads especially if the perfect size of bladder was too large. Furthermore, if the filling hoses are not properly balanced to supply all the bladders together, one bladder could potentially continue to dump air although the remaining bladders are not yet filled. Each of these bladders can easily be connected and disconnected if the vessel has no discreet location to keep them while safe at harbor, anchor, or on dock.

Even if the vessel should suffer an "accidental grounding" and rip out the keel, get T-boned by another vessel, or run into an abandoned floating shipping container, the described system can maintain the vessel afloat even if some of the hoses are ripped out because of the check valves and over-compensation of available pressurized air.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A system comprising:
   one or more inflatable bladders;
   one or more compressed gas storage tanks;
   one or more valves coupled between the one or more inflatable bladders and the one or more compressed gas storage tanks, each valve having a lever for opening and closing the valve and a flexible link coupled to each lever; and
   a float coupled to each flexible link;
   wherein each flexible link extends somewhat perpendicularly away from the lever end to pass through an eyelet at distal point before being coupled to the float such that buoyant action of the float in any direction can cause the flexible link to be pulled toward the eyelet and thereby pull the lever and opening the valve causing compressed gas in the one or more compressed gas storage tanks to fill the one or more inflatable bladders.

2. The system of claim 1, wherein a first manifold is coupled between the one or more compressed gas storage tanks and the one or more valves.

3. The system of claim 1, wherein a second manifold is coupled between the one or more valves and the one or more inflatable bladders.

4. The system of claim 1, wherein the one or more inflatable bladders are anchored to bulkhead or stringers within an interior of a water vessel.

5. The system of claim 1, wherein the one or more inflatable bladders comprise six inflatable bladders within an interior of a water vessel.

6. The system of claim 1, wherein the one or more compressed gas storage tanks comprise four compressed gas storage tanks disposed along a central hull of a water vessel.

7. The system of claim 1, wherein at least one of the one or more inflatable bladders is secured using at least one strap to an elongated hole in an L bracket of an anchor plate where the L bracket is secured with a backing plate.

8. The system of claim 1, wherein the one or more inflatable bladders are disposed on the deck adjacent to gunnels of the vessel.

9. The system of claim 1, wherein a pressure regulated valve is coupled between each of the one or more inflatable bladders and the one or more compressed gas storage tanks.

10. The system of claim 1, wherein at least one of the one or more inflatable bladders comprises a rectangular shape having clipped corners.

* * * * *